(12) United States Patent
Shinozaki et al.

(10) Patent No.: US 7,607,875 B2
(45) Date of Patent: Oct. 27, 2009

(54) FASTENER FOR FIXING A PART TO A BODY PANEL

(75) Inventors: Nobuya Shinozaki, Kanagawa (JP); Hirofumi Tanaka, Saitama (JP); Akihiro Shibuya, Saitama (JP); Yasuo Mochioka, Saitama (JP)

(73) Assignees: Piolax Inc., Yokohama-shi (JP); Honda Motor Co., Ltd., Tokyo (JP)

( * ) Notice: Subject to any disclaimer, the term of this patent is extended or adjusted under 35 U.S.C. 154(b) by 46 days.

(21) Appl. No.: 11/092,942

(22) Filed: Mar. 30, 2005

(65) Prior Publication Data
US 2005/0220560 A1   Oct. 6, 2005

(30) Foreign Application Priority Data

Mar. 31, 2004 (JP) .......................... P. 2004-102857
Mar. 31, 2004 (JP) .......................... P. 2004-104899
Aug. 23, 2004 (JP) .......................... P. 2004-241821

(51) Int. Cl.
*F16B 13/06* (2006.01)
*F16B 13/04* (2006.01)

(52) U.S. Cl. .............................. 411/45; 411/41; 411/21

(58) Field of Classification Search ............ 411/45–48, 411/41, 21, 358–359
See application file for complete search history.

(56) References Cited

U.S. PATENT DOCUMENTS

| | | | | |
|---|---|---|---|---|
| 1,940,430 A | * | 12/1933 | Morterra ........................ | 51/160 |
| 2,966,243 A | * | 12/1960 | Clapper ......................... | 52/161 |
| 3,526,069 A | * | 9/1970 | Deike ........................... | 52/160 |
| 3,871,430 A | * | 3/1975 | Meyer ........................... | 24/323 |
| 4,645,394 A | * | 2/1987 | While et al. .................... | 411/110 |
| 4,655,659 A | * | 4/1987 | Leemke ......................... | 411/359 |
| 4,927,287 A | * | 5/1990 | Ohkawa et al. ................. | 403/408.1 |

(Continued)

FOREIGN PATENT DOCUMENTS

DE   25 27 023   12/1977

(Continued)

OTHER PUBLICATIONS

German Office Action date Oct. 24, 2006 with English translation.

*Primary Examiner*—Victor Batson
*Assistant Examiner*—David C Reese
(74) *Attorney, Agent, or Firm*—McGinn IP Law Group, PLLC

(57) ABSTRACT

A fastener including a pin, a grommet and a pinching member, wherein the pin includes a head portion and a shaft portion, the grommet includes a flange portion and a barrel portion, and the pinching member includes an inward directed support arm and an outward directed pinching piece, the head portion includes a support portion for supporting the inward directed support arm of the pinching member, a containing chamber for containing a side of the outward directed pinching piece of the pinching member to direct in a direction of a center of the shaft portion and a press face for pressing outward the outward directed pinching piece of the pinching member at the shaft portion of the pin and forming an opening window for putting in and out the outward directed pinching piece of the pinching member at the barrel portion of the grommet.

6 Claims, 19 Drawing Sheets

U.S. PATENT DOCUMENTS

| | | | | |
|---|---|---|---|---|
| 4,952,106 | A * | 8/1990 | Kubogochi et al. | 411/48 |
| 5,010,698 | A * | 4/1991 | Hugron | 52/160 |
| 5,261,772 | A * | 11/1993 | Henninger et al. | 411/46 |
| 5,865,559 | A * | 2/1999 | Yang | 403/322.1 |
| 6,095,737 | A * | 8/2000 | Barker et al. | 411/359 |
| 6,435,790 | B1 * | 8/2002 | Ichikawa | 411/349 |
| 6,533,515 | B2 * | 3/2003 | Meyer | 411/45 |
| 6,702,535 | B1 * | 3/2004 | Stevenson et al. | 411/82 |
| 6,955,514 | B2 * | 10/2005 | Hoshi | 411/508 |
| 2005/0152764 | A1 * | 7/2005 | Jackson | 411/45 |
| 2005/0220560 | A1 * | 10/2005 | Shinozaki et al. | 411/37 |

FOREIGN PATENT DOCUMENTS

| | | |
|---|---|---|
| GB | 2 173 851 | 4/1986 |
| JP | 3332138 | 7/2002 |
| JP | 2006083936 A * | 3/2006 |

* cited by examiner

FASTENER FOR FIXING A PART TO A BODY PANEL

BACKGROUND OF THE INVENTION

1. Field of the Invention

The present invention relates to a fastener for fixing an interior or an exterior part or the like of an automobile to a predetermined vehicle body panel.

2. Description of the Related Art

Although not specifically illustrated, a fastener of this kind of a background art includes two parts of a pin made of a synthetic resin and a grommet made of a synthetic resin. The former member of the pin is provided with a head portion in a shape of a circular disk and a shaft portion in a shape of a circular cylinder hung from a lower face of the head portion. The shaft portion is formed with a large diameter groove and a small diameter groove at a side face thereof along an axial direction. The latter member of the grommet is provided with a flange portion in a shape of a circular disk and a barrel portion in a shape of a circular cylinder hung from a lower face of the flange portion. The flange portion is formed with an opening for inserting the shaft portion of the pin at a center thereof. The barrel portion is constituted such that a peripheral wall thereof is divided into a plurality of divided leg pieces via slits. Furthermore, inner faces of front end portions of the respective divided leg pieces are formed with bulged projections for individually engaging with the large diameter groove and the small diameter groove of the above-described shaft portion (refer to, for example, Japanese Patent No. 3332138).

Further, when a trim board constituting an interior part of an automobile is actually fixed to a vehicle body panel the shaft portion of the pin is inserted into the barrel portion of the grommet from a front end side thereof to provide a tacked state in which the bulged projection formed at the inner faces of the front end portions of the respective divided leg pieces of the grommet are engaged with the small diameter groove formed at the shaft portion of the pin. When the barrel portion of the grommet is inserted into respective attaching holes of the trim board and the vehicle body panel coinciding with each other under the state and the head portion of the pin is pushed to be completely brought into contact with the flange portion of the grommet the bulged projections of the respective divided leg pieces are engaged with the large diameter groove of the shaft portion, and the divided leg pieces of the grommet are expanded to open outward. Thereby, the trim board is fixed to a side of the vehicle body panel.

Therefore, although under the fastener of the background art, there is achieved an advantage of fixing the trim board and the vehicle body panel simply, on the other hand, in the state of fixing the trim board, in view of a relationship that the trim board and the vehicle body panel are pinched from inner and outer sides by the flange portion and the divided leg pieces of the grommet made of the synthetic resin, as a matter of course, a force of pinching the vehicle body panel to a hole edge of the attaching hole is weakened. Therefore, a strong pinching force cannot be exerted.

SUMMARY OF THE INVENTION

The invention has been developed in order to effectively resolve the problem posed by the fastener of the background art. According to a first aspect of the invention, there is provided a fastener including three parts of a pin made of a synthetic resin, a grommet made of a synthetic resin and a pinching member made of a metal. The pin includes a head portion and a shaft portion. The grommet includes a flange portion and a barrel portion. The pinching member includes an inward directed support arm and an outward directed pinching piece. Wherein by forming a support portion for supporting the inward directed support arm of the pinching member slidably in an axial direction, a containing chamber for containing a side of the outward directed pinching piece of the pinching member to direct in a direction of a center of the shaft portion, and a press face for pressing outward the outward directed pinching piece of the pinching member at the shaft portion of the pin outward, and forming an opening window for putting in and out the outward directed pinching piece of the pinching member at the barrel portion of the grommet, an object to be fixed is pinched by the flange portion of the grommet made of the synthetic resin and the outward directed pinching piece of the pinching member made of the metal projected outward from the opening window.

According to a second aspect of the invention, the support portion formed at the shaft portion of the pin includes an engaging edge for engaging with to hang down the inward directed support arm of the pinching member at a lower end thereof, and the pinching member is contained in the containing chamber formed at the shaft portion of the pin in a state of being hung down on the premise of the first aspect of the invention.

According to a third aspect of the invention, the engaging edge included by the support portion constitutes an inclined face along the inward directed support arm of the inclined pinching member on the premise of the second aspect of the invention.

According to a fourth aspect of the invention, the pinching member includes a detachment preventing claw directed outward on a side thereof opposed to the inward directed support arm and the flange portion of the grommet includes a catch portion for catching the detachment preventing claw on the premise of the first through third aspect of the invention.

According to a fifth aspect of the invention, an upper face of the catch portion included by the flange portion of the grommet constitutes a taper shape on the premise of the fourth aspect of the invention.

According to a sixth aspect of the invention, the catch portion included by the flange portion of the grommet includes an upper wall the upper face of which is constituted by the taper shape and a lower wall extended in a diameter direction on a lower side of the upper wall and the detachment preventing claw of the pitching member is brought into a recess space partitioned between the upper wall and the lower wall on the premise of the fourth aspect of the invention.

According to a seventh aspect of the invention, the inward directed support arm of the pinching member can be moved in inner and outer side directions of the support portion at least at a lower end region of the support portion formed at the shaft portion of the pin, in a state of moving the inward directed support arm in the inner side direction of the support portion, the detachment preventing claw of the pinching member can pass the catch portion, and in a state of moving the inward directed support arm in the outer side direction of the support portion, the detachment preventing claw of the pinching member cannot pass the catch portion on the premise of the fourth aspect of the invention.

According to an eighth aspect of the invention, the head portion of the pin includes a thick-walled upper plate and a thin-walled lower plate and a groove for inserting a tool is partitioned between the upper plate and the lower plate on the premise of the first aspect of the invention.

According to a ninth aspect of the invention, a lower edge of the opening window formed at the barrel portion of the grommet is proximate to be opposed to a lower face of the outward directed pinching piece of the pinching member on the premise of the first aspect of the invention.

According to a tenth aspect of the invention, the pinching member includes a pair thereof, the barrel portion of the grommet is divided into two or more of divided leg pieces by a plurality of slits in the divided leg pieces, the divided leg pieces opposed to each other on one side are formed with opening windows for putting in and out the outward directed pinching pieces of the respective pinching members and the pinching members are formed with bulged projections pressed outward by engaging with the shaft portion of the pin on an inner face side thereof on the premise of the first aspect of the invention.

According to a eleventh aspect of the invention, a pair of movement preventing walls are projected from both side edges of the containing chambers formed at the shaft portion of the pin on the premise of the first through tenth aspect of the invention.

According to a twelfth aspect of the invention, there is provided a fastener including three parts of a pin made of a synthetic resin, a grommet made of a synthetic resin and a pinching member made of a metal. The pin includes a head portion and a shaft portion. The grommet includes a flange portion and a barrel portion. The pinching member includes an outward directed support arm and an outward directed pinching piece. Wherein the pin is formed with a containing chamber for receiving a side of the outward directed pinching piece of the pinching member to direct in a direction of a center of the shaft portion and a press face for pressing the outward directed pinching piece of the pinching member outward at the shaft portion, the flange portion or the barrel portion of the grommet is formed with a support portion for holding the outward directed support arm of the pinching member, the barrel portion is formed with an opening window for putting in and out the outward directed pinching piece of the pinching member, and an object to be fixed is pinched by the flange portion of the grommet made of the synthetic resin and the outward directed pinching piece of the pinching member made of the metal projected outward from the opening window.

According to a thirteenth aspect of the invention, when the press face formed at the shaft portion of the pin presses outward the outward directed pinching piece of the pinching member, elastic bending is brought about at the pinching member, and when the outward directed pinching piece of the pinching member is received by the containing chamber formed at the shaft portion of the pin, the pinching member is elastically recovered in a direction of eliminating the elastic bending and the outward directed pinching piece of the pinching member is immerged from the opening window formed at the barrel portion of the grommet on the premise of the twelfth aspect of the invention.

According to a fourteenth aspect of the invention, the flange portion of the grommet is formed with a support groove in a recess shape extended from an inner hole thereof in a diameter enlarging portion, and the outward directed support arm of the pinching member is held by the support groove on the premise of the thirteenth aspect of the invention.

According to a fifteenth aspect of the invention, the support groove is provided with a projected portion and the outward directed support arm of the pinching member is provided with a recess portion for fitting the projected portion on the premise of the fourteenth aspect of the invention.

According to a sixteenth aspect of the invention, the outward directed support arm of the pinching member is pivotably held by the support portion of the grommet on the premise of the twelfth aspect of the invention.

According to a seventeenth aspect of the invention, the outward directed support arm of the pinching member is constituted by a hook shape in a shape of a circular arc and pivotably held by constituting a fulcrum by an inner side of the hook shape on the premise of the sixteenth aspect of the invention.

According to a eighteenth aspect of the invention, a side of the flange portion of the grommet is partitioned with a space for permitting to pivot the outward directed support arm of the pinching member on the premise of the sixteenth aspect of the invention.

According to a nineteenth aspect of the invention, a side of the head portion of the pin is partitioned with a space for permitting to pivot the outward directed support arm of the pinching member on the premise of the sixteenth aspect of the invention.

Therefore, according to the first aspect of the invention, when the inward directed support arm of the pinching member is supported by the support portion formed at the shaft portion of the pin, the pinching member is moved down while being slid via the inward directed support and a side of the outward directed pinching piece is contained in the containing chamber of the shaft portion. Therefore, when the shaft portion of the pin is inserted into the barrel portion of the grommet as it is, the pin and the grommet are tacked while the pinching member is being present inside of the barrel portion. Therefore, when the pin and the grommet are inserted into respective attaching holes of objects to be fixed coinciding with each other, the shaft portion of the pin is pushed into the barrel portion of the grommet completely until the head portion of the pin is brought into contact with the flange portion of the grommet. By operation of the press face on a side of the shaft portion, the outward directed pinching piece of the pinching member is projected outward from the opening window formed at the barrel portion of the grommet. Thereby, the objects to be fixed are pinched from inner and outer sides thereof between the flange portion of the grommet made of the synthetic resin and outward directed pinching piece of the pinching member made of the metal and in comparison with the constitution of the background art, the objects to be fixed are firmly fixed by a strong pinching force.

According to the second aspect of the invention, when the inward directed support arm of the pinching member is engaged with the engaging edge of the support portion formed at the shaft portion of the pin to hang down, the pinching member per se is inclined in a direction of a center of the shaft portion of the pin, the outward directed pinching piece is contained in the containing chamber of the shaft portion and therefore, the shaft portion of the pin is facilitated to be pushed into the barrel portion of the grommet while supporting the pinching member and in such a state, the outward directed pinching piece of the pinching member is immerged into the opening window formed at the barrel portion of the grommet and therefore, similarly, even in the case of being inserted into the attaching holes of the objects to be fixed, the outward directed pinching piece of the pinching member does not constitute a hindrance. According to the third aspect of the invention, the engaging edge of the support portion constitutes the inclined face along the inward directed support arm of the inclined pinching member and therefore, the pinching member per se can further firmly be inclined in the direction of the center of the shaft portion.

According to the fourth aspect of the invention, under the state of tacking the pin and the grommet, the detachment preventing claw of the pinching member is caught by the catch portion included by the flange portion of the grommet and therefore, there is not a concern of disassembling the three members by releasing the tacked state. According to the fifth aspect of the invention, when the shaft portion of the pin is inserted into the barrel portion of the grommet, the detachment preventing claw of the pinching member supported by the shaft portion of the pin is guided by the taper shape of the catch portion and therefore, tacking operation is facilitated. According to the sixth aspect of the invention, under the state of tacking the pin and the grommet, the detachment preventing claw of the pinching member is brought into the recess space partitioned between the upper wall and the lower wall of the catch portion and therefore, particularly, the detachment preventing claw of the pinching member can firmly be caught by the catch portion of the flange portion.

According to the seventh aspect of the invention, under the state in which the detachment preventing claw of the pinching member is moved in the inner side direction of the support portion, the detachment preventing claw can pass the catch portion included by the flange portion of the grommet. Therefore, when the pin and the grommet are tacked, the pin and the grommet can be tacked simply by a small force, after tacking the pin and the grommet, conversely, under the state of moving the detachment preventing claw in the outer side direction of the support portion, the detachment preventing claw cannot pass the catch portion of the flange portion and therefore, even when the shaft portion of the pin is going to be drawn out from the barrel portion of the grommet, the shaft portion cannot be drawn out therefrom and there is not a concern of simply releasing the tacked state.

According to the eighth aspect of the invention, the shaft portion of the pin can be drawn out from the barrel portion of the grommet by inserting a front end of a tool of a minus screwdriver or the like into the inserting groove partitioned between the thick-walled upper plate and the thin-walled lower plate included by the head portion of the pin. Therefore, whereas the drawing operation is facilitated, the inner directed support arm and the detachment preventing claw of the pinching member can be concealed by the thin-walled lower plate and therefore, promotion of an outlook can also be expected.

According to the ninth aspect of the invention, the lower edge of the opening window formed at the barrel portion of the grommet is proximate to be opposed to the lower face of the outward directed pinching piece of the pinching member and therefore, in a state of pinching the objects to be fixed by the outward directed pinching piece, the outward directed pinching piece is backed by the lower edge of the opening window and the firm pinching force of the outward pinching piece can be exerted. According to the tenth aspect of the invention, when the divided leg piece divided from the barrel portion of the grommet is expanded to open outward, the lower edge of the opening window formed at the divided leg piece can support the lower face of the front end portion of the outward directed pinching piece of the pinching member and therefore, a force of backing the outward pinching piece can further effectively be exerted.

According to the eleventh aspect of the invention, the pairs of movement preventing walls are projected from the both side edges of the containing chambers formed at the shaft portion of the pin and therefore, when the shaft portion of the pin is inserted into the barrel portion of the grommet while supporting the pinching members. Accordingly, there is not a concern of extruding the pinching members from the containing chambers in left and right outward directions. As a result, operation of inserting the pin into the grommet is always carried out smoothly.

According to the twelfth aspect of the invention, when there is achieved a state of holding the outward directed support arm of the pinching member at the support portion formed at the flange portion or the barrel portion of the grommet and the shaft portion of the pin is inserted into the barrel portion of the grommet as it is, while supporting the pinching member on an inner side of the barrel portion, the pin and the grommet are tacked. Therefore, when the fastener is inserted into respective attaching holes of objects to be fixed coinciding with each other, further, the shaft portion of the pin is pressed into the barrel portion of the grommet completely until the head portion of the pin is brought into contact with the flange portion of the grommet, by operation of the press face of the shaft portion, the outward directed pinching piece of the pinching member is projected outward from the opening window formed at the barrel portion of the grommet. Therefore, the objects to be fixed are pinched from inner and outer sides between the flange portion of the grommet made of the synthetic resin and the outward directed pinching piece of the pinching member made of the metal and in comparison with the constitution of the background art, the objects to be fixed are solidly fixed by a strong pinching force.

According to the thirteenth aspect of the invention, in drawing out the pin, when the outward directed pinching piece of the pinching member is received in the containing chamber formed at the shaft portion of the pin, the pinching member is elastically recovered in a direction of eliminating the elastic bending, the outward directed pinching piece is immerged in an inner direction automatically from the opening window formed at the barrel portion of the grommet. Therefore, a force of drawing out the pin can be alleviated, and when a state of fixing the objects to be fixed is released to separate from each other by detaching the grommet or the like, the pinching member can be prevented from being caught by the attaching holes of the objects to be fixed.

According to the fourteenth aspect of the invention, the outward directed support arm of the pinching member is held in the support groove in the recess shape on the side of the grommet and therefore, a firm holding state can be expected and the elastic bending of the pinching member can easily be provided. According to the fifteenth aspect of the invention, by only pressing the outward directed support arm of the pinching member from above by being guided by the recess shape of the support groove, the projected portion of the support groove and the recess portion of the outward directed support arm are fitted to each other and therefore, the firm holding state of the pinching member can further by expected and in drawing out the pin, the pinching member is made to be difficult to be detached.

According to the sixteenth aspect of the invention, in view of a relationship of holding the outward directed support arm of the pinching member pivotably by the support portion of the grommet, even when elastic bending or elastic recovery is difficult to be achieved, in view of the structure, the pinching member per se can be formed by the highly rigid metal plate and therefore, the fastener having the stronger pinching force can be provided. According to the seventeenth, eighteenth and nineteenth aspect of the invention, pivoting movement of the pinching member can positively be promoted.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

According to the invention, a fastener per se is constituted by three parts of a pin made of a synthetic resin, a grommet made of a synthetic resin and a pinching member made of a metal, and when an object to be fixed is fixed, the object to be fixed is made to be able to be fixed by pinching the object to be fixed by a flange portion of the grommet made of a synthetic resin and an outward directed pinching piece of the pinching member made of a metal more solidly than the fastener of the background art.

Embodiment 1

Figure 1:
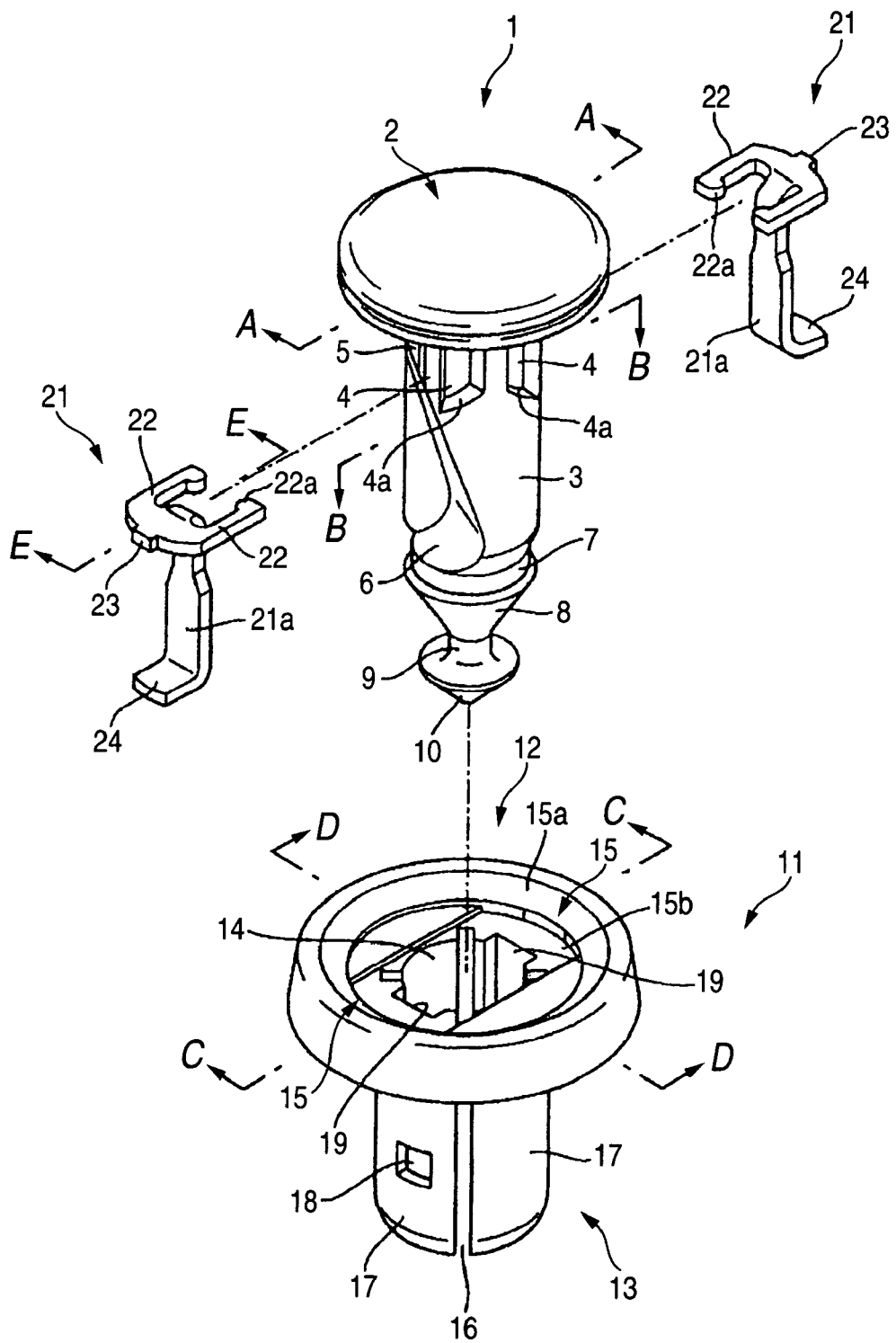
FIG. 1 is a disassembled perspective view showing a fastener according to an embodiment of the invention.

Describing the invention in details based on preferable embodiments as follows, different from the fastening piece of the background art, as shown by FIG. 1, the fastening piece according to the embodiment includes three parts of a pin 1 made of a synthetic resin, a grommet 11 made of a synthetic resin and a pinching member 21 made of a metal and is characterized in that the following constitution is adopted for the respective parts 1, 11, 21. Further, with regard to the pinching member made of a metal, the pinching members 21 are used in a paired relationship.

The invention has been developed in order to effectively resolve the problem posed by the fastener of the background art. According to a first aspect of the invention, there is provided a fastener including three parts. The three parts include a synthetic resin pin, a synthetic resin grommet, and a metal pinching member. The pin includes a head portion and a shaft portion. The grommet includes a flange portion and a barrel portion. The pinching member includes an inward directed support arm and an outward directed pinching piece. The pin includes a support portion that axially-slidably supports inward directed support arms of the pinching member. The pin includes a chamber to radially-inwardly accommodate a side of an outward directed pinching piece of the pinching member. The pin further includes a press face that outwardly presses the outward directed pinching piece. The grommet includes an opening window at a barrel portion of the grommet for receiving the outward directed pinching piece of the pinching member. An object may be pinched between the flange portion and the outward directed pinching piece when projected outward from the opening window.

Further, there is constructed a constitution in which a lower portion side of the shaft portion 3 is formed with a large diameter groove 7 in a ring-like shape for engaging with a divided leg piece 17 of the grommet 11, mentioned later, and formed with a small diameter groove 9 in a ring-like shape continuous from the large diameter groove 7 via a taper face 8, further, a guide projection 10 in a converging shape is hung down from a front end portion thereof and therefore, the shaft portion 3 of the pin 1 is smoothly inserted into a barrel portion 13 of the grommet 11, mentioned later.

Figure 3A:
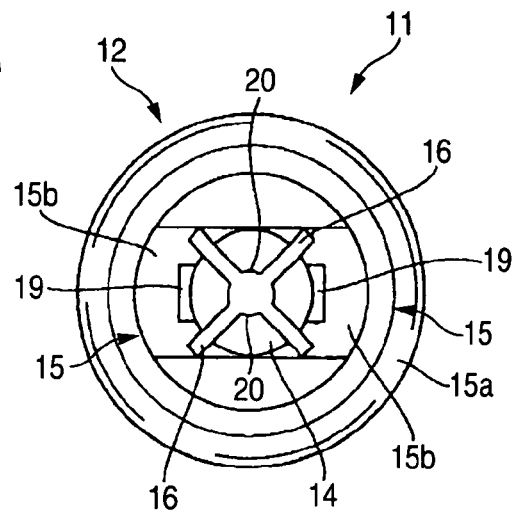
FIG. 3A is a plane view of a grommet.
Figure 3B:
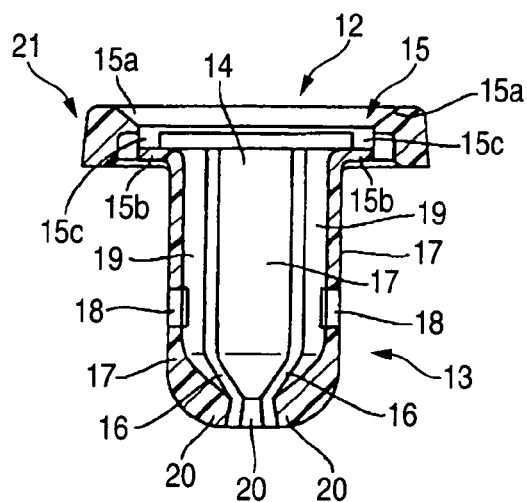
FIG. 3B is a sectional view taken along a line C-C of FIG. 1.
Figure 3C:
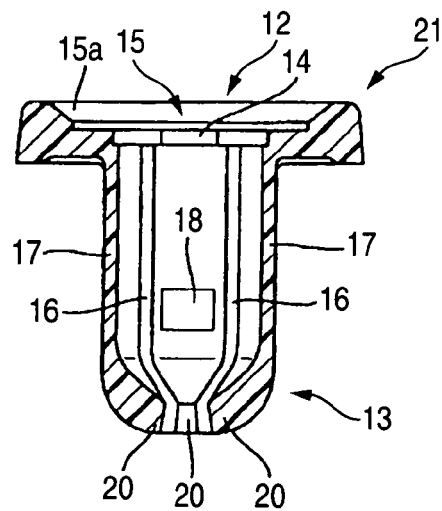
FIG. 3C is a sectional view taken along a line D-D of FIG. 1.

Next, also as shown by FIGS. 3A to 3C, the grommet 11 made of a synthetic resin is provided with a flange portion 12 in a shape of a circular disk and the barrel portion 13 in a shape of a circular cylinder, and is constructed by a constitution in which the former member of the flange portion 12 is formed with an opening 14 communicating with a hollow region of the barrel portion at a center portion thereof, and an outer periphery opposed thereto is formed with a pair of catch portions 15 for catching detachment preventing claws 23 of the pinching members 21, mentioned later, and each of the catch portions 15 includes an upper wall 15a continuous in a circumferential direction, a lower wall 15b extended in a diameter direction below a portion of the upper wall 15a, and a recess space 15c partitioned between the upper wall 15a and the lower wall 15b. Further, an upper face of the upper wall 15a continuous in the circumferential direction is positively provided with a taper shape for guiding the detachment preventing claw 23 of the pinching member, mentioned later.

Further, the latter member of the barrel portion 13 is constructed by a constitution in which a peripheral wall thereof is divided into four sheets of the divided leg pieces 17 via slits 16 in an axial direction, in four sheets of the divided leg pieces 17, the divided leg pieces 17 opposed to each other on one side are individually formed with opening windows 18 for putting in and out front end portions of the outward directed pinching pieces 24 of the pinching member 21, and whereas inner faces of the respective divided leg pieces 17 reaching the opening windows 18 from upper end edges thereof are formed with recess grooves 19 for permitting to move front ends of the outward pinching pieces 24 of the pinching member 21, inner faces of front end sides of four sheets of the divided leg pieces 17 are formed with bulged projections 20 for engaging with the large diameter groove 7 and the small diameter groove 9 of the shaft portion 3 of the pin 1, mentioned above.

Figure 4:
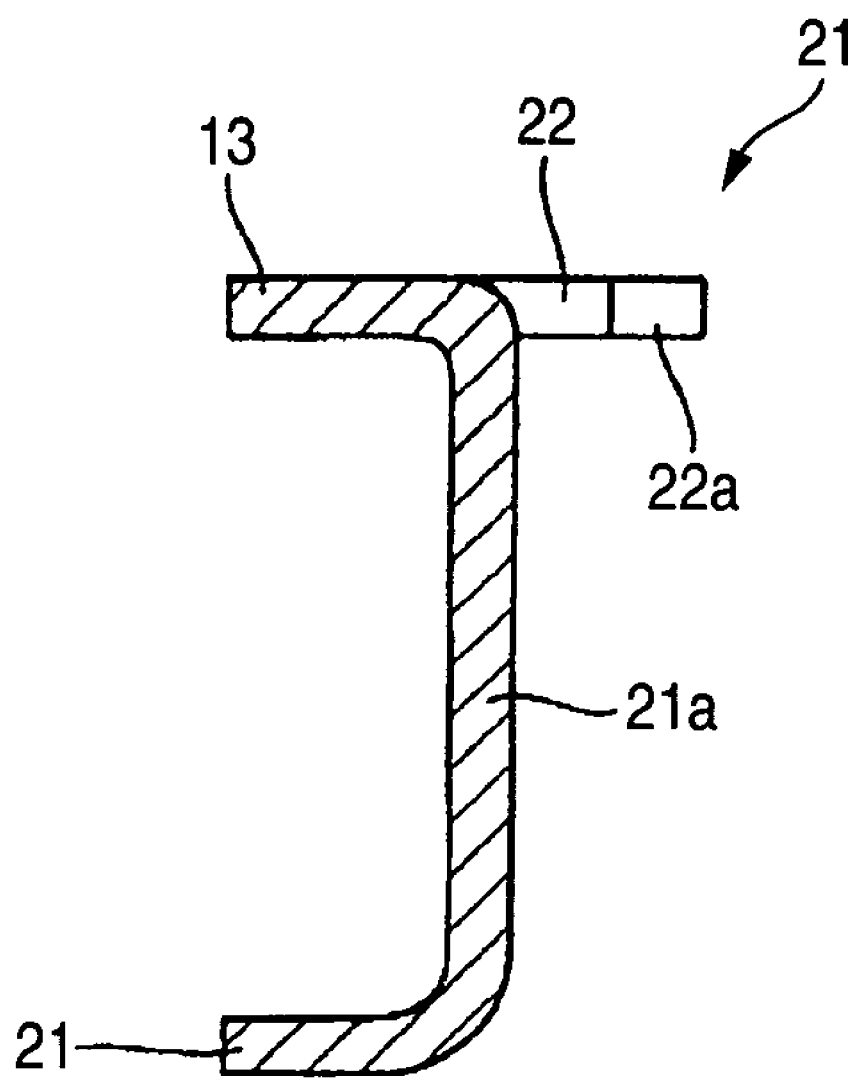
FIG. 4 is a sectional view taken along a line E-E of FIG. 1 showing a pinching member.

Finally, a pair of the pinching members 21 made of a metal are used symmetrically in a left and right direction and also as shown by FIG. 4, constructed by a constitution in each of which whereas an upper end edge of a main body 21a thereof which is vertically prolonged is formed with the inward directed support arm 22 in a bifurcated shape folded to bend to inner sides, and a side thereof opposed to the inward directed support arm 22 is formed with the detachment preventing claw 23 directed outward, a lower end edge of the main body 21a is formed with the outward directed pinching piece 24 folded to bend to an outer side. Further, an inner face of the front end of the inward directed support arm 22 in the bifurcated shape is provided with a projected portion 22a facing inside of the support groove 4 of the pin 1, mentioned above.

Figure 2A:
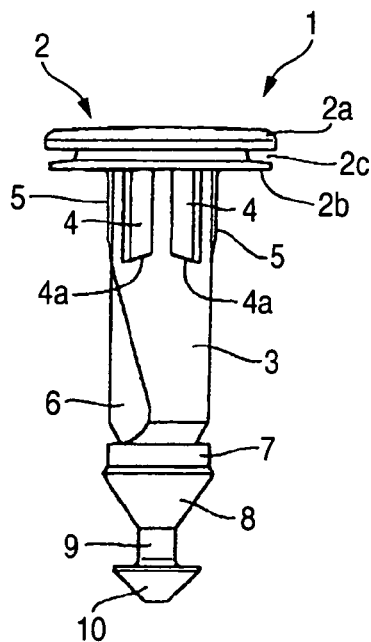
FIG. 2A is a front view of a pin.
Figure 2B:
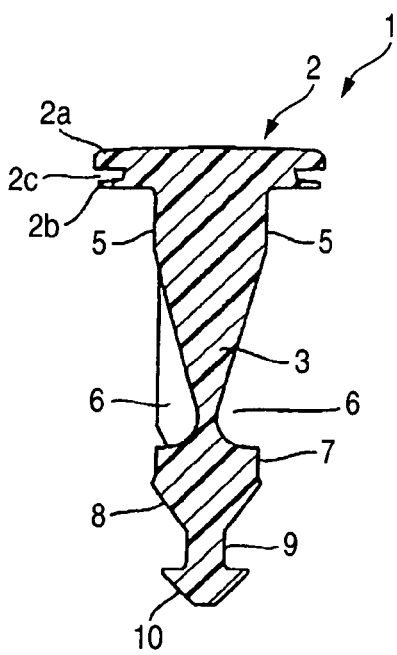
FIG. 2B is a sectional view taken along a line A-A of FIG. 1.
Figure 2C:
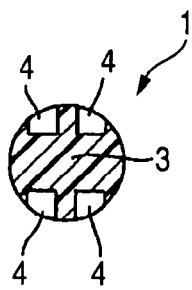
FIG. 2C is a sectional view taken along a line B-B of FIG. 1.

The pin 1 is made of a synthetic resin and is also shown by FIGS. 2A and 2C. The pin 1 has a disk-shaped head portion 2 and a cylindrical shaft portion 3. The head portion 2 includes a thick-walled upper plate 2a and a thin-walled lower plate 2b and an inserting groove 2c in a ring-like shape for inserting a front end of a tool between the upper plate 2a and the lower plate 2b. The shaft portion 3 includes support grooves 4 on opposing side faces of an upper portion of the shaft portion 3. The support grooves 4 slidably accommodate in an axial direction the inward directed support arms 22 of the pinching member 21 which is described below. The shaft portion 3 further includes two opposing press faces 5 for outwardly pressing outward directed pinching pieces 24 of the pinching member 21 which is described below. Sides of the middle portion of the shaft portion 3 include containing chambers 6 for accommodating outward directed pinching pieces 24 of the pinching member 21 which is described below in an inward radial direction. The support grooves 4 include engaging edges 4a for engaging the inner directed support arms 22 so that the pinching members 21 hand down. The engaging edges 4a have inclined faces.

Further, the detachment preventing claws 23 of the pinching members 21 are able to pass the catch portions 15 of the grommet 11 while the pinching members 21 hang by the inner directed support arms 22 from the engaging edges 4a in the support grooves 4 and when the inward directed support arms 22 are moved to a radially-inward position. Conversely, when the inward directed support arms 22 are moved within the support grooves to a radially-outward position the detachment preventing claws 23 are unable to pass the catch portions 15 of the grommet 11.

Figure 5:
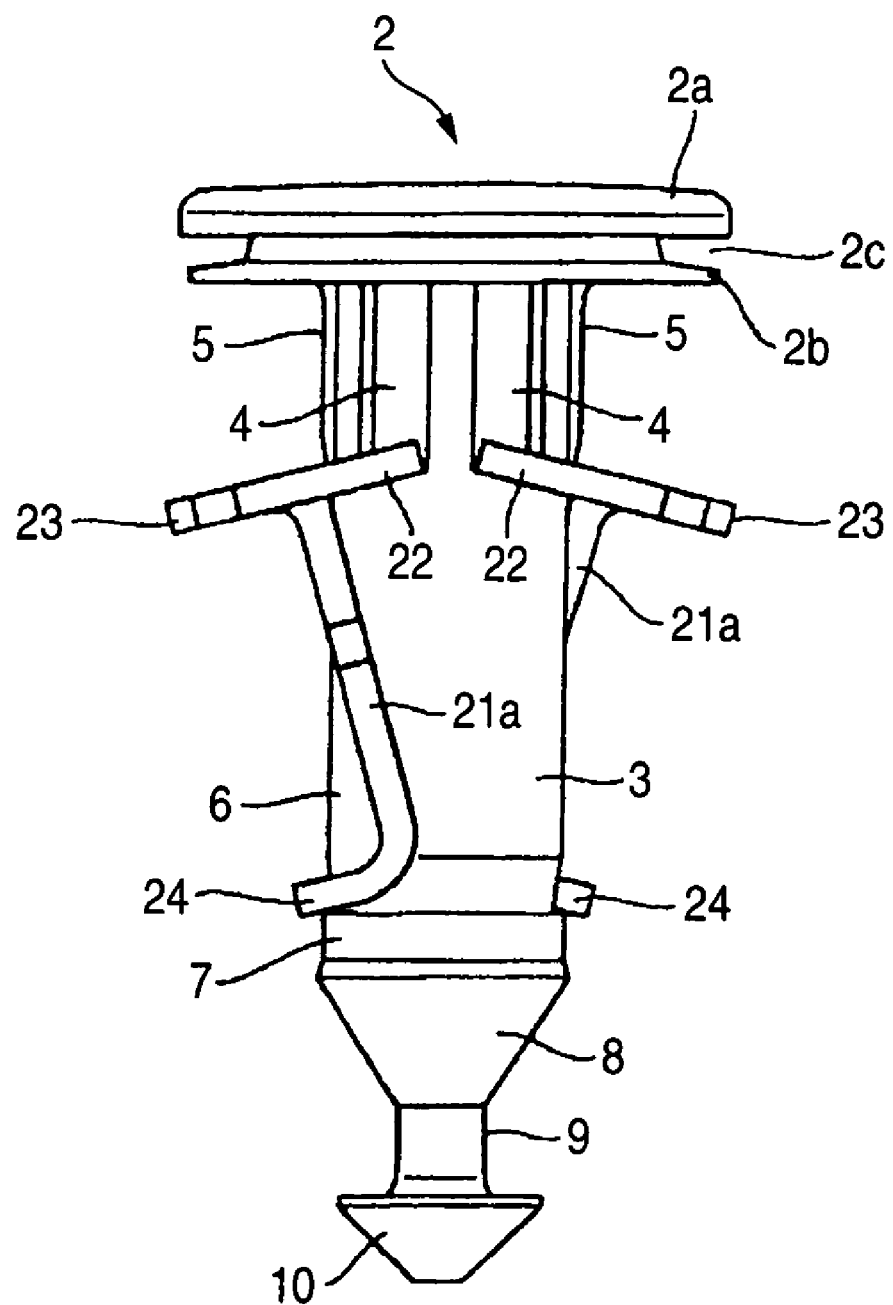
FIG. 5 is a front view showing a state of supporting a pair of the pinching members at a shaft portion of the pin.

Therefore, when a trim board P1 constituting an interior part of an automobile is now assumedly fixed to a predetermined vehicle body panel P2 by using the fastening piece having such a constitution, first, when the inward directed support arms 22 in the bifurcated shape of the respective pinching members 21 are engaged with the support grooves 4 formed at the shaft portion 3 of the pin 1 from outer sides, the respective pinching members 21 are moved down to be brought into contact with the engaging edges 4a while sliding via the inward directed support arms 22, as described above, the engaging edges 4a of the support grooves 4 are constituted by the continuous inclined faces directed downward and therefore, as shown by FIG. 5, the pair of pinching members 21 are supported in a state of containing sides of the main bodies 21a including the outward directed pinching pieces 24 in the containing chambers 6 of the shaft portion 3 in correspondence therewith while being inclined in directions of centers of the shaft portion 3.

Therefore, even when the shaft portion 3 of the pin 1 is inserted into the barrel portion 13 of the grommet 11, presence of the pair of pinching members 21 does not constitute a hindrance. However, although front end portions of the outer directed pinching pieces 24 of the respective pinching members 21 are projected more or less outward from an outer periphery face of the shaft portion 3 in view of dimensions thereof, in inserting into the barrel portion 13, the projection of the outer directed pinching pieces 24 is absorbed by the recess grooves 19 of the respective divided leg pieces 17, mentioned above, and therefore, no problem is posed.

Figure 6:
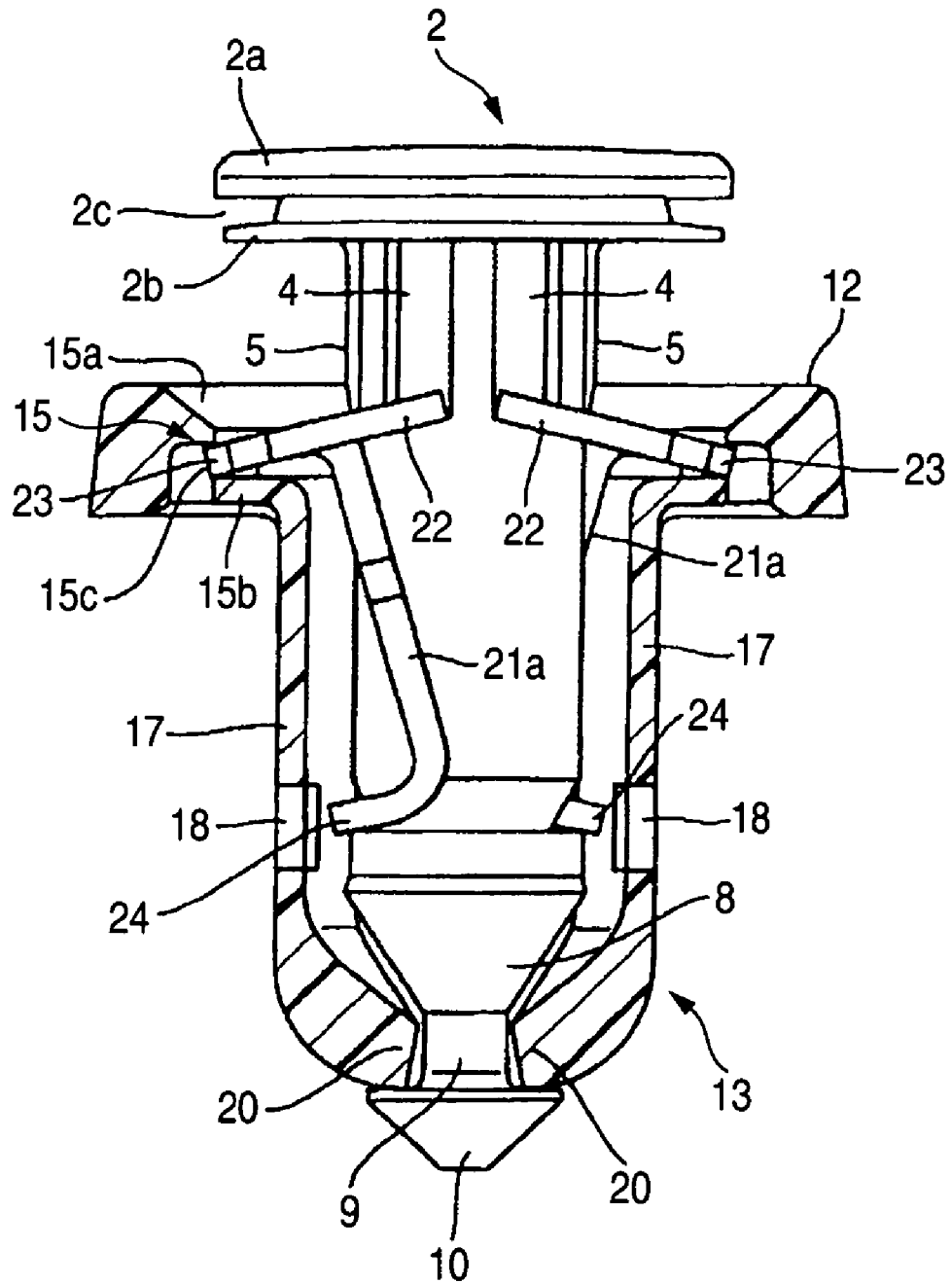
FIG. 6 is a sectional view showing a state of tacking the pin to the grommet along with the pinching member.

Hence, next, the shaft portion 3 of the pin 1 is inserted into the barrel portion 13 of the grommet 11 while inclining the pair of pinching members 21 and in this case, when inserted while making the front end portion of the outward directed pinching pieces 24 of the pinching members 21 more or less projected outward and the recess grooves 19 coincide with each other, the detachment preventing claws 23 of the respective pinching members 21 are moved in directions of inner sides at lower end portions of the support grooves 4 while being guided by utilizing the taper shape of the upper walls 15a constituting the catch portions 15 on the side of the grommet 11 and therefore, as shown by FIG. 6, thereby, the detachment preventing claws 23 of the respective pinching members 21 smoothly pass the upper walls 15a and simultaneously therewith, the guide projection 10 of the pin 1 is projected outward from the front end edge of the barrel portion 13 to tack the pin 1 and the grommet 11 temporarily.

Further, in this case, as illustrated, the bulged projections 20 of the respective divided leg pieces 17 of the barrel portion 13 are engaged with the small diameter groove 9 of the shaft portion 3. Therefore, the respective divided leg pieces 7 are not expanded to open yet, and also the outward directed pinching pieces 24 of the respective pinching members 21 are not projected outward from the opening windows 18 in correspondence therewith but completely immerged into the barrel portion 13 of the grommet 11.

Further, by bringing the guide projection 10 into contact with front end edge of the barrel portion 13, the pin 1 is tentatively prevented from being detached, in addition thereto, after the detachment preventing claws 23 of the pinching members 21 pass the upper walls 15a of the catch portions 15, the inward directed support arms 22 of the respective pinching members 21 are moved in outer side directions at lower end portions of the support grooves 4 of the inclined faces of the engaging edges 4a of the support grooves 4, the detachment preventing claws 23 of the respective pinching members 21 are brought into the recess spaces 15c partitioned between the upper walls 15a and the lower walls 15b. Therefore, the pin 1 is prevented from being detached and there is not a concern of unpreparedly disassembling the three members 1, 11, 21.

Figure 7:
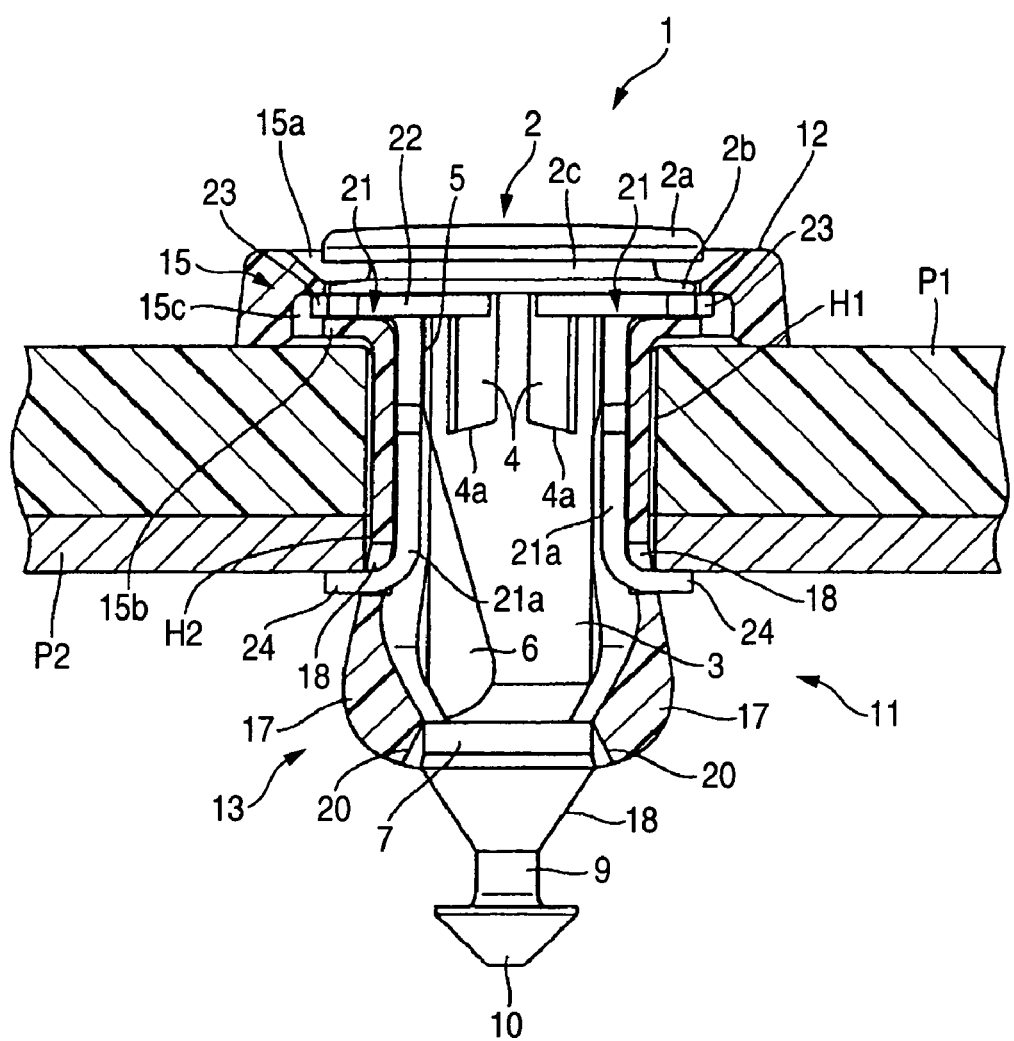
FIG. 7 is a sectional view showing a state of fixing a trim board and a vehicle body panel in an overlapped state by using the fastener.

Therefore, after achieving the state of tacking the pin 1 and the grommet 11, when the trim board P1 is made to overlap the vehicle body panel P2, the barrel portion 13 of the grommet 11 is inserted into respective attaching holes H1, H2 coinciding with each other. Further, the shaft portion 3 of the pin 1 is pushed into the barrel portion 13 of the grommet 11 completely until the head portion 2 of the pin 1 is brought into contact with the flange portion 12 of the grommet 11, at this occasion, side of the outward directed pinching pieces 24 of the respective pinching members 21 which have been contained at insides of the containing chambers 6 of the shaft portion 3 are pressed by the press faces 5 of the shaft portion 3, the outward directed pinching pieces 24 of the respective pinching members 21 are significantly projected outward from the opening windows 18 formed at the respective divided leg pieces 17 opposed to each other of the grommet 11. Therefore, as shown by FIG. 7, the trim board P1 and the vehicle body panel P2 are pinched between the flange portion 12 of the grommet 11 made of the synthetic resin and the outward directed pinching pieces 24 of the pinching members 21 made of the metal, and the two members P1, P2 are solidly overlapped to fix by a strong pinching force exerted by the synthetic resin and the metal. Therefore, reliability of the fixed state is further promoted.

Further, in the fixed state, by pushing the pin 1, as illustrated, at this occasion, the bulged projections 20 of the respective divided leg pieces 17 are engaged with the large diameter groove 7 formed at the shaft portion 3 of the pin 1 to expand to open outward. Therefore, also by expanding to open the respective divided leg pieces 17, the trim board P1 and the vehicle body panel P2 can be pinched. Therefore, also thereby, the solid fixed state can be strengthened, particularly on a side at which the pinching members 21 made of the metal are not present, the divided leg pieces 27 which are not formed with the opening windows 18 are positively related to the pinching and therefore, a uniform pinching force is achieved over an entire periphery thereof.

Further, by projecting the outward directed pinching pieces 24 of the pinching members 21 outward from the opening windows 18 of the divided leg pieces 17, the lower edges of the respective windows are proximate to be opposed to the lower faces of the outward directed pinching pieces 24, in this case, when the divided leg pieces 17 in correspondence therewith are expanded to open outward, the lower edges of the opening windows 18 formed at the divided leg pieces 17 can support the lower faces of the front end portions of the outward directed pinching pieces 24 of the pinching members 21. Therefore, a force of backing the outward directed pinching piece 24 is effectively exerted and the outward directed pinching pieces 24 made of the metal are not bent.

Conversely, when the state of fixing the trim board P1 and the vehicle body panel P2 is released as necessary, when a front end of a tool of a minus screwdriver or the like (not illustrated) is inserted into the inserting groove 2c partitioned at the side face of the head portion 2 of the pin 1 and the shaft portion 3 of the pin 1 is pulled up from the barrel portion 13 of the grommet 11 to the above-described tacked state, the sides of the outward directed pinching pieces 24 of the respective pinching members 21 which have been pressed by the press faces 5 formed at the shaft portion 3 of the pin 1 are contained again into the containing chambers 6 of the shaft portion 3, the front end portions of the outward directed pinching pieces 24 are immerged into the barrel portion 13 of the grommet 11. Therefore, after achieving such a state, when the inward directed support arms 22 of the pair of pinching members 21 are moved in inner side directions at inside of the support grooves 4, the respective detachment preventing claws 23 can pass the upper walls 15a of the catch portions 15 and therefore, when the shaft portion 3 of the pin 1 is completely drawn out from the barrel portion 13 of the grommet 11 along with the pinching members 21 as they are, the shaft portion 3 of the pin 1 can be drawn out from the barrel portion 13 of the grommet 11 by a small force without unnecessarily deforming not only the pin 1 and the grommet 11 but also the pinching members 21. Therefore, thereby, the fastener per se can sufficiently be used again.

Embodiment 2

Next, explaining a fastener according to a second embodiment, although a constitution of the second embodiment basically follows that of the first embodiment which has been described already as it is, a difference therebetween resides in a constitution in which whereas a pair of movement preventing walls 30 are integrally projected from both side edges of two pieces of the containing chambers 6 formed on the side of the shaft portion 3 of the pin 1 in a state of being in parallel with each other, peripheral edges present on the side of the support groove 4 of the lower plate 2b constituting the head portion 2 of the pin 1 are cut by cuts 31 and projected streaks 32 in parallel with edges of the cuts 31 are provided on the upper plate 2a at positions right above edges of the cuts 31.

Figure 9:
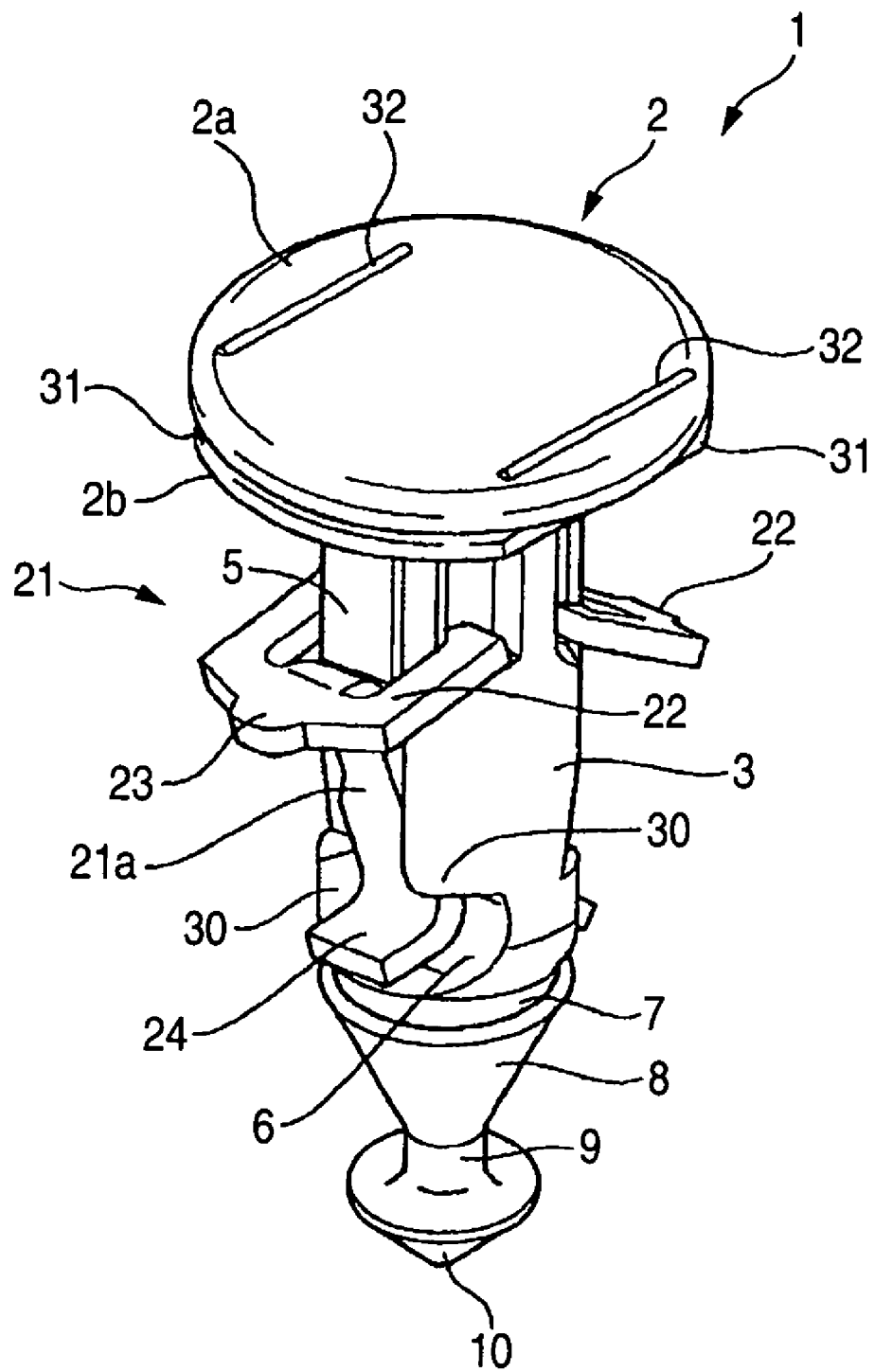
FIG. 9 is a perspective view showing a state of supporting a pair of pinching members of a shaft portion of a pin.
Figure 10:
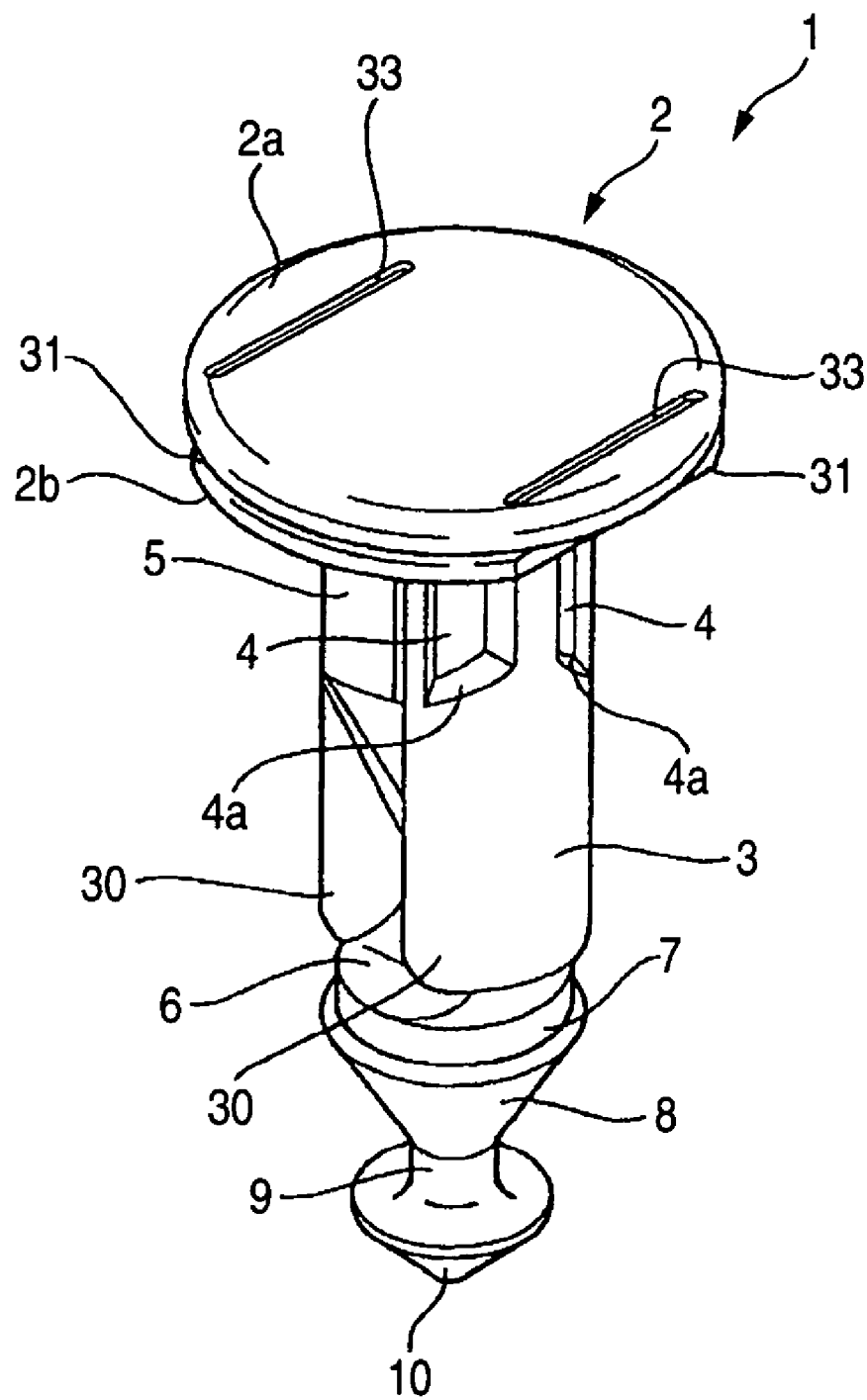
FIG. 10 is a perspective view showing a modified example of the pin according to the second embodiment.

Therefore, according to the second embodiment, by presence of the above-described pair of movement preventing walls 30, when the pinching members 21 are supported by the shaft portion 3 of the pin 1 and inserted into the barrel portion 13 of the grommet 11, as shown by FIG. 9, the pinching members 21 never extrude from the containing chamber 6 in a left and right direction and therefore, inserting operation is always carried out smoothly. Further, although the pair of movement preventing walls 30 are projected therefrom by shifting the positions in an up and down direction in view of a structure of a die, the invention is not limited thereto but as shown by FIG. 10, the pair of movement preventing walls 30 can also be projected integrally over entire regions of the both side edges of the respective containing chambers.

Further, by forming the above-described cuts 31 at the lower plate 2b, a front end of a tool of a minus screwdriver or the like is facilitated to be inserted to a lower face of the upper plate 2a. Therefore, the pin 1 is facilitated to be drawn out from the barrel portion 13 of the grommet 11, particularly in this case, the cuts 31 are formed on the sides of the support grooves 4 by avoiding the pinching members 21. Therefore, in drawing out the pin 1, the pinching members 21 can also be prevented from being damaged by the front end of the tool of a minus screwdriver or the like.

Figure 8:
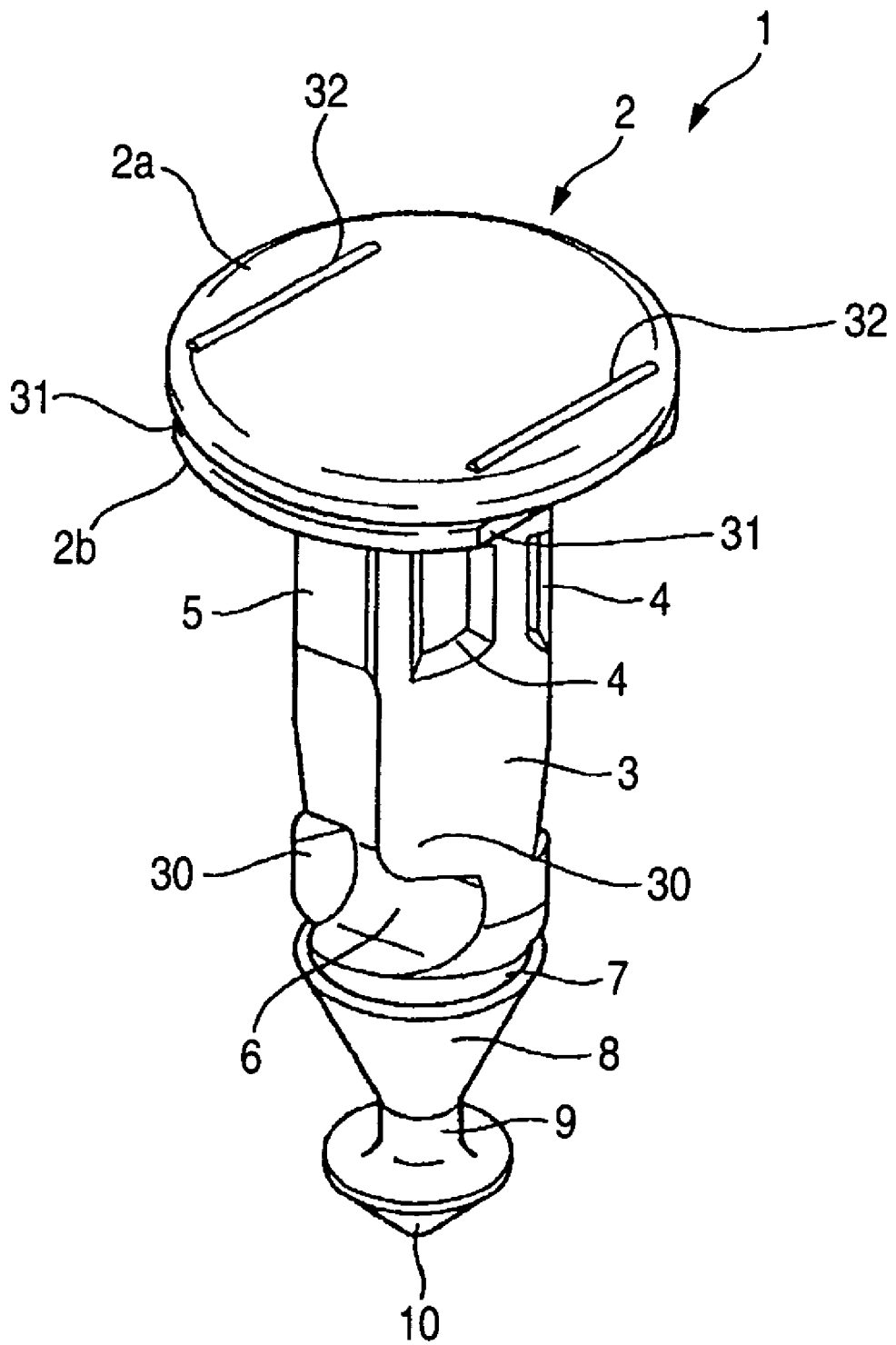
FIG. 8 is a perspective view showing only a pin provided for a fastener according to a second embodiment of the invention.

Further, by providing the projected streaks 32 in parallel with the edges of the cuts 31 on the upper plate 2a, in inserting the front end of the tool of a minus screwdriver or the like, mentioned above, the front end of the tool can be inserted to a depth portion of the position right below the projected streaks 32. Thereby, the front end of the tool can be inserted to the deepest portion without interfering with the pinching member 21 to be damaged thereby and therefore, by utilizing the tool as a lever, the pin 1 can be drawn out further easily by a light force. Further, although according to the second embodiment, as shown by FIG. 8 and FIG. 9, the projected streak 32 is provided as a mark in the operation, the invention is not limited thereto but as shown by FIG. 10, the mark can be constituted by a recess streak 33, other than the projected streak 32 or the recess streak 33, the mark may be a marking provided at a position in correspondence with the edge of the cut 31 on the upper plate 2a. Other constitution, operation and effect are similar to those of the first embodiment and therefore, an explanation thereof will be omitted here.

Embodiment 3

Figure 11:
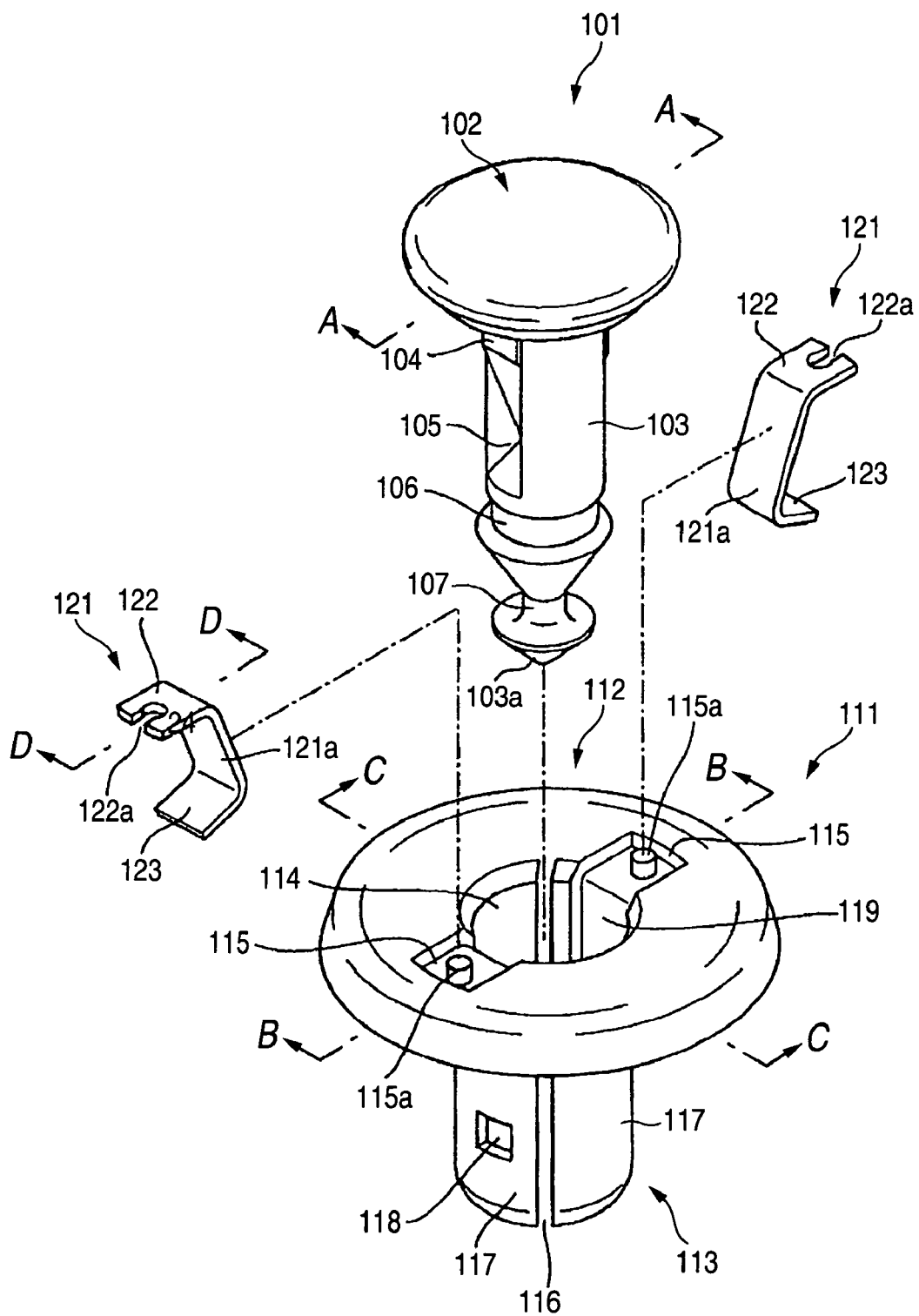
FIG. 11 is a disassembled perspective view showing a fastener according to a third embodiment of the invention.

Describing the invention in details based on preferable embodiments as follows, different from the fastening piece of the background art, as shown by FIG. 11, the fastening piece according to the embodiment includes three parts of a pin 101 made of a synthetic resin, a grommet 111 made of a synthetic resin and a pinching member 121 made of a metal and is characterized in that the following constitution is adopted for the respective parts 101, 111, 121. Further, with regard to the pinching member made of a metal, the pinching members 121 are formed by an elasticity metal board that the stiffness is low, and used in a paired relationship.

Figure 12:
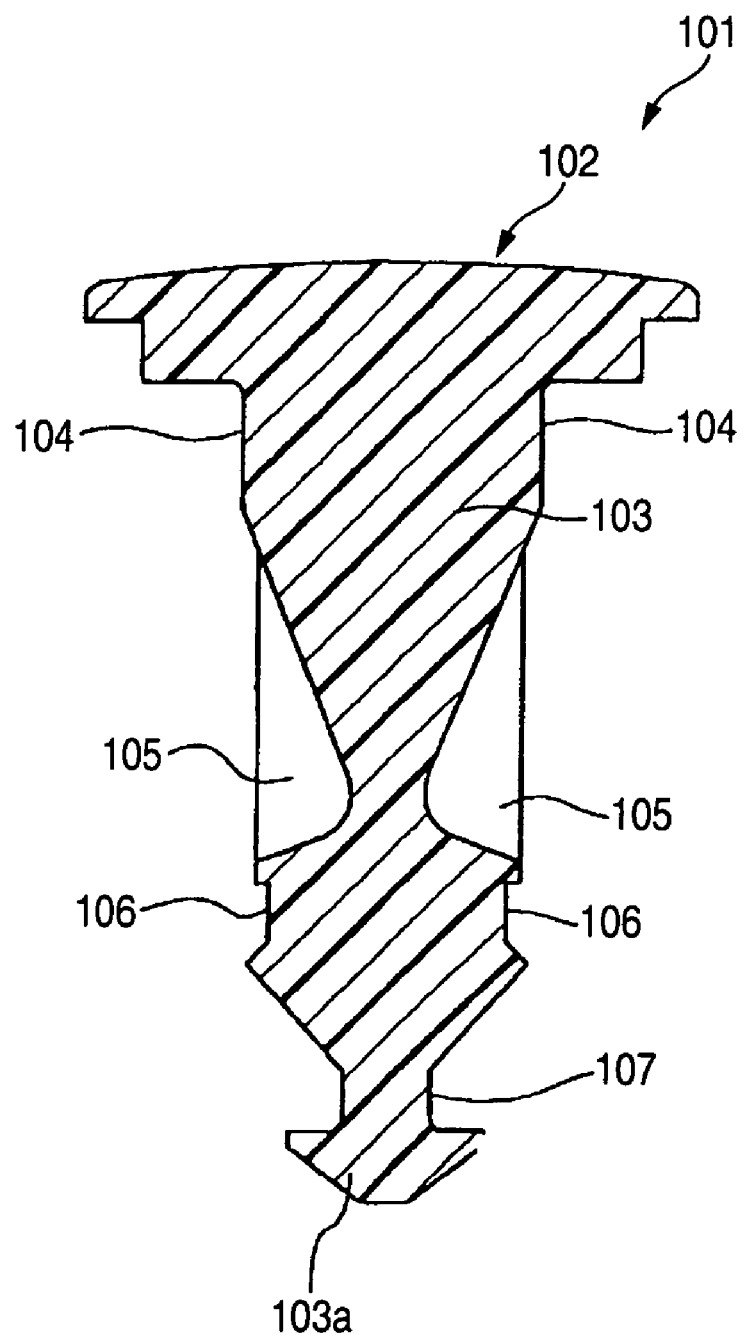
FIG. 12 is a sectional view taken along a line A-A of FIG. 11 showing a pin.

Hence, first, explaining from the pin 101 made of a synthetic resin, also as shown by FIG. 12, the pin 101 is provided with a head portion 102 in a shape of a circular disk and a shaft portion 103 in a shape of a circular cylinder, particularly, the latter member of the shaft portion 103 is constructed by a constitution in which respectives of side faces opposed to each other of an upper portion thereof are formed with a pair of press faces 104 for pressing outward directed pinching pieces 123 of the pinching member 121, mentioned later, whereas respectives of middle portions continuous from the respective press faces 104 are formed with a pair of containing chamber 105 for receiving sides of the outward directed pinching pieces 123 of the pinching member 121 to direct in directions of a center of the shaft portion 103, a lower portion of the shaft portion 103 is formed with a large diameter groove 106 in a ring-like shape for engaging with divided leg pieces 117 of the grommet 111, mentioned later, at lower portions of the respective containing chambers 105 and formed with a small diameter groove 107 in a ring-like shape continuous from the large diameter groove 106 via a taper face, further, a front end portion 103a in a converging shape is hung down from a lower portion thereof.

Figure 13A:
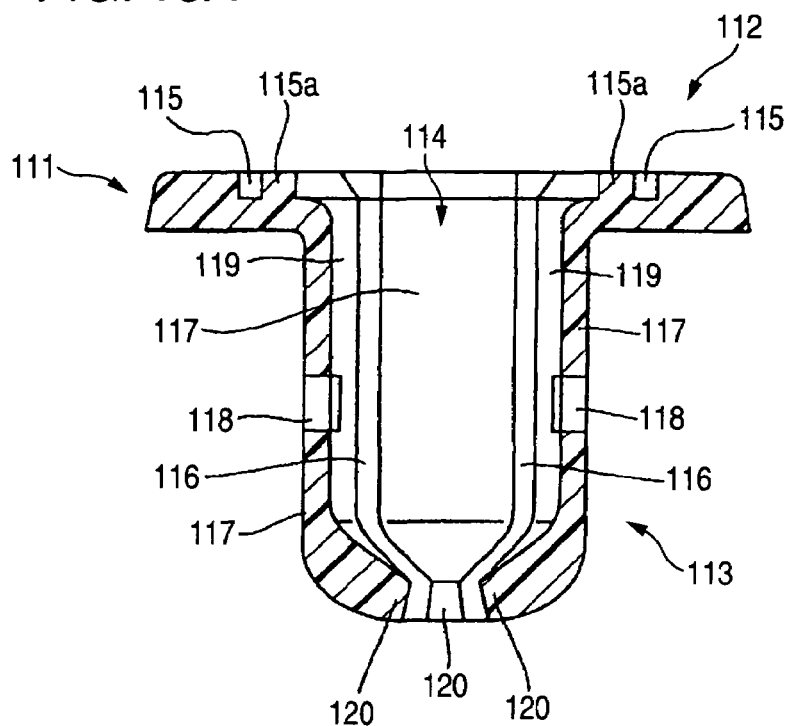
FIG. 13A is a sectional view taken along a line B-B of FIG. 11 showing a grommet and FIG. 13B is a sectional view taken along a line C-C of FIG. 11.
Figure 13B:
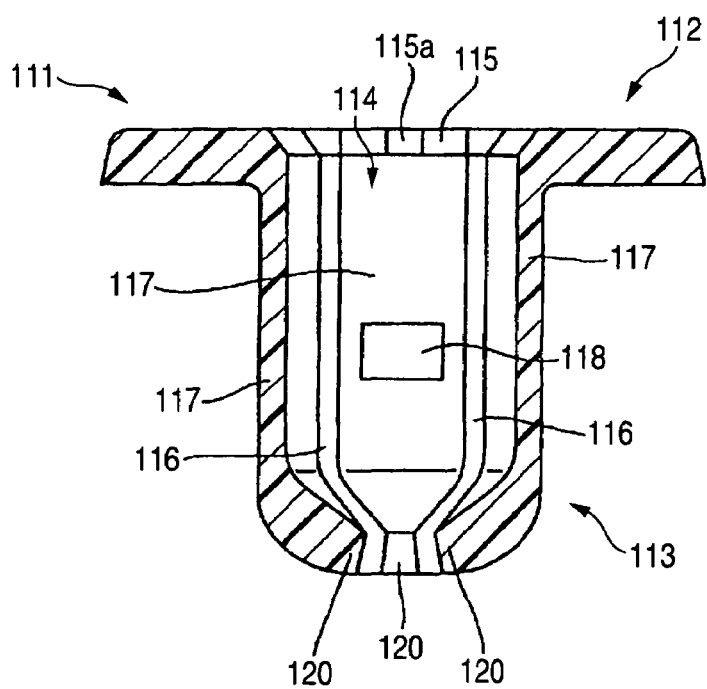

Next, also as shown by FIGS. 13A and 13B, the grommet 111 made of a synthetic resin is provided with a flange portion 112 in a shape of a circular disk and a barrel portion 113 in a shape of a circular cylinder, the former member of the flange portion 112 is constructed by a constitution in which a center portion thereof is formed with an opening 114 communicating with an inner hole of the barrel portion 113 at the center portion thereof, outer peripheral portions thereof opposed to each other are formed with support grooves 115 in a recess shape constituting support portions for holding outward directed support arms 122 of the pinching member, mentioned later, and bottom faces of the respective support grooves 115 are individually formed with the projected portion 15a in a shape of a pin fitted into recess portions 122a of the outward directed support arms 122, mentioned later.

Further, the latter member of the barrel portion 113 is constructed by a constitution in which a peripheral wall thereof is equally divided into four sheets of the divided leg pieces 117 via slits 116 in an axial direction, in four sheets of the divided leg pieces 117, a pair of the divided leg pieces 117 in correspondence with the respective support grooves 115 are formed with opening windows 118 for putting in and out the outward directed pinching pieces 123 of the pinching member, whereas inner faces of the respective divided leg pieces 117 reaching the opening windows 118 from upper end edges thereof are formed with mounting grooves 119 for mounting main bodies 121a of the pinching member 121, mentioned later, inner faces on lower end sides of four sheets of the divided leg pieces 117 are integrally formed with bulged projections 120 for engaging with the large diameter groove 106 and the small diameter groove 107 formed at the shaft portion 103 of the pin 101, mentioned above.

Figure 14:
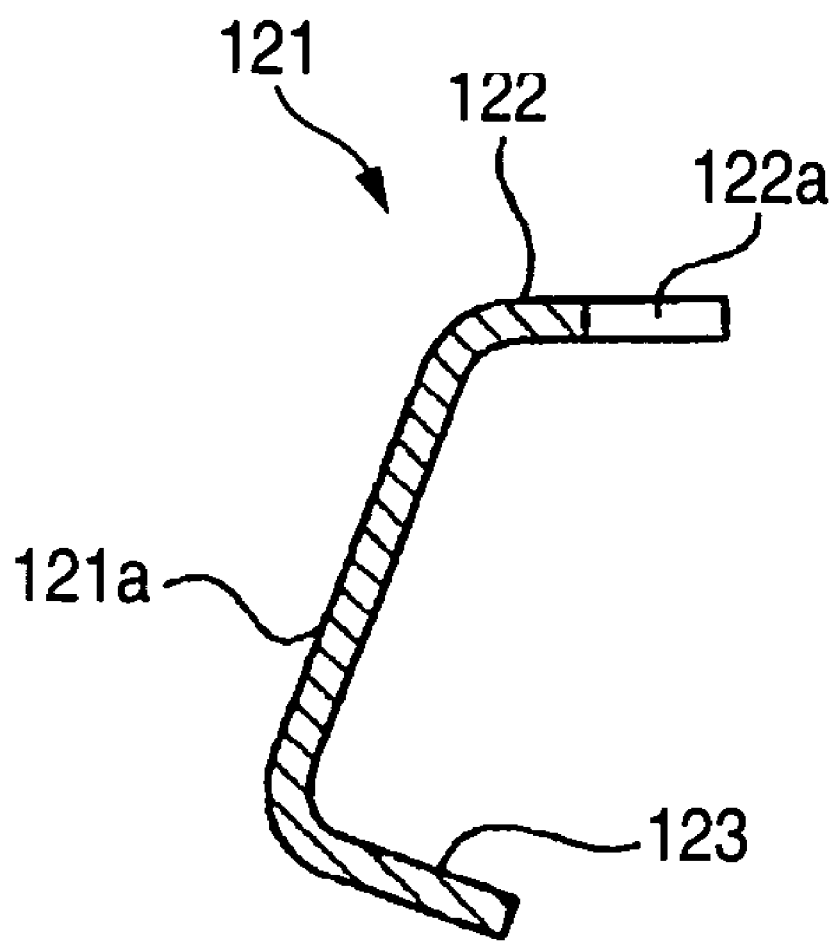
FIG. 14 is a sectional view taken along a line D-D of FIG. 11 showing a pinching member.

Finally, the pinching member 121 made of a metal is used as a pair thereof symmetrically in a left and right direction, also as shown by FIG. 14, constructed by a constitution in which whereas an upper end edge of the main body 121a prolonged vertically is formed with the outward directed support arm fold to bend outward by a constant inclination angle and a center portion of the outward directed support arm 122 is formed with the recess portion 122a in a shape of a slit fitted with the projected portion 115a formed at the support groove 115 of the grommet 111, a lower end edge of the main body 121a is formed with the outward directed pinching piece 123 folded to bend outward in right angle.

Further, according to the pair of pinching members 121, when the inclined outward directed support arms 122 at an upper portion thereof are held by the support grooves 115 of the grommet 111 in correspondence therewith by fitting the projected portions 115a and the recess portions 122a, sides of the outward directed pinching pieces 123 are held at inside of the barrel portion 113 of the grommet 111 by constituting an inclined state, under such a state, when the pinching members 121 are pressed outward by the press faces 104 of the pin 101, elastic bending is brought about out at the pinching members 121, when the outward pinching pieces 123 of the pinching members 121 are received by the containing chambers 105 formed at the shaft portion 103 of the pin 101, the outward directed pinching pieces 123 of the pinching members 121 are set to immerge from the opening windows 118 formed at the barrel portion 113 of the grommet 111 by being elastically recovered in a direction of eliminating the elastic bending.

Figure 15:
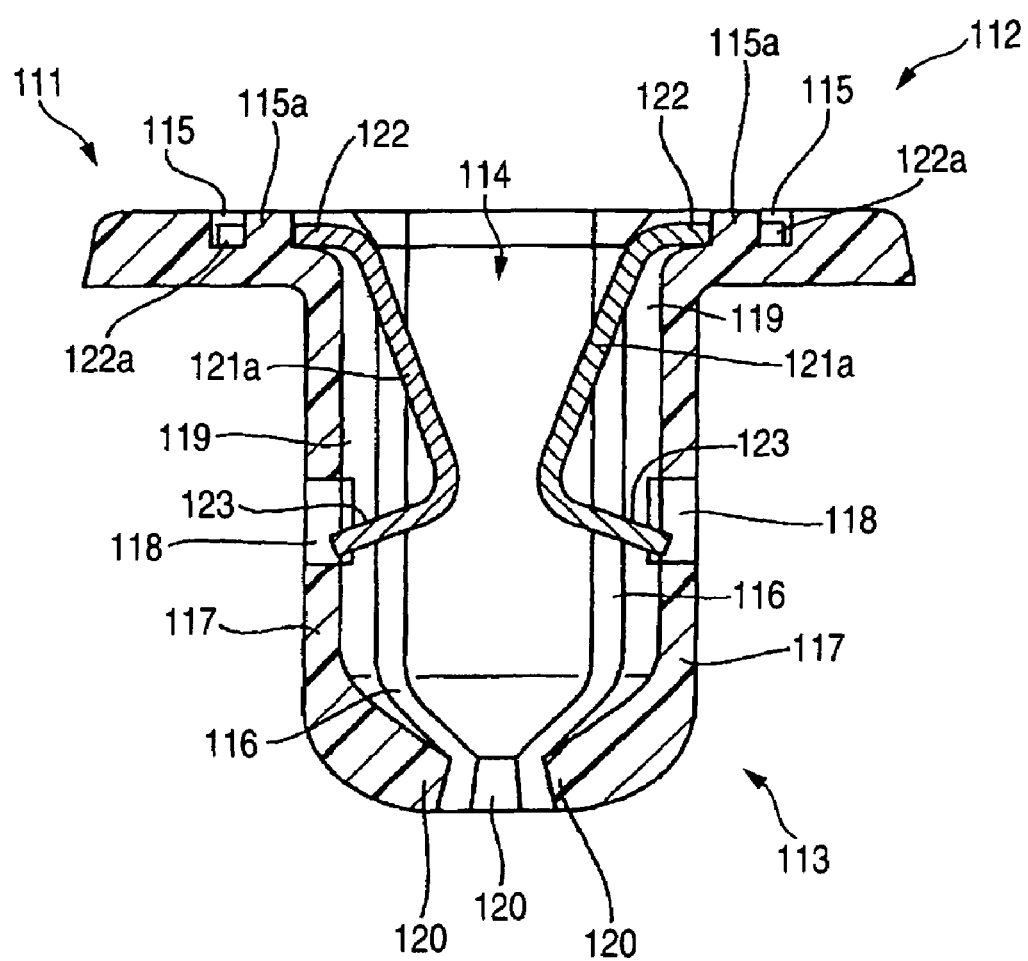
FIG. 15 is a sectional view showing a state of holding a pair of the pinching members in a barrel portion of the grommet.

Therefore, now, when a trim board P11 constituting an interior part of an automobile is assumedly fixed to a predetermined vehicle body panel P12 by using the fastener having such a constitution, first, when the respective outward directed support arms 122 of the pinching members 121 in correspondence with the pair of support grooves 115 are pushed into the pair of support grooves 115 formed at the flange portion 112 of the grommet 111 from above, the respective outward directed support arms 122 of the pinching members 121 are held in the support grooves 115 by achieving a state of fitting the projected portions 115a and the recess portions 122a, in this case, as described above, the outward directed support arms 122 are folded to bend from the upper end edges of the main body 121a by a constant inclination angle and therefore, owing thereto as shown by FIG. 15, sides of the outward directed pinching pieces 123 of the pinching members 121 are arranged to be inclined in a shape of an angle at inside of the barrel portion 113 of the grommet 111.

Figure 16:
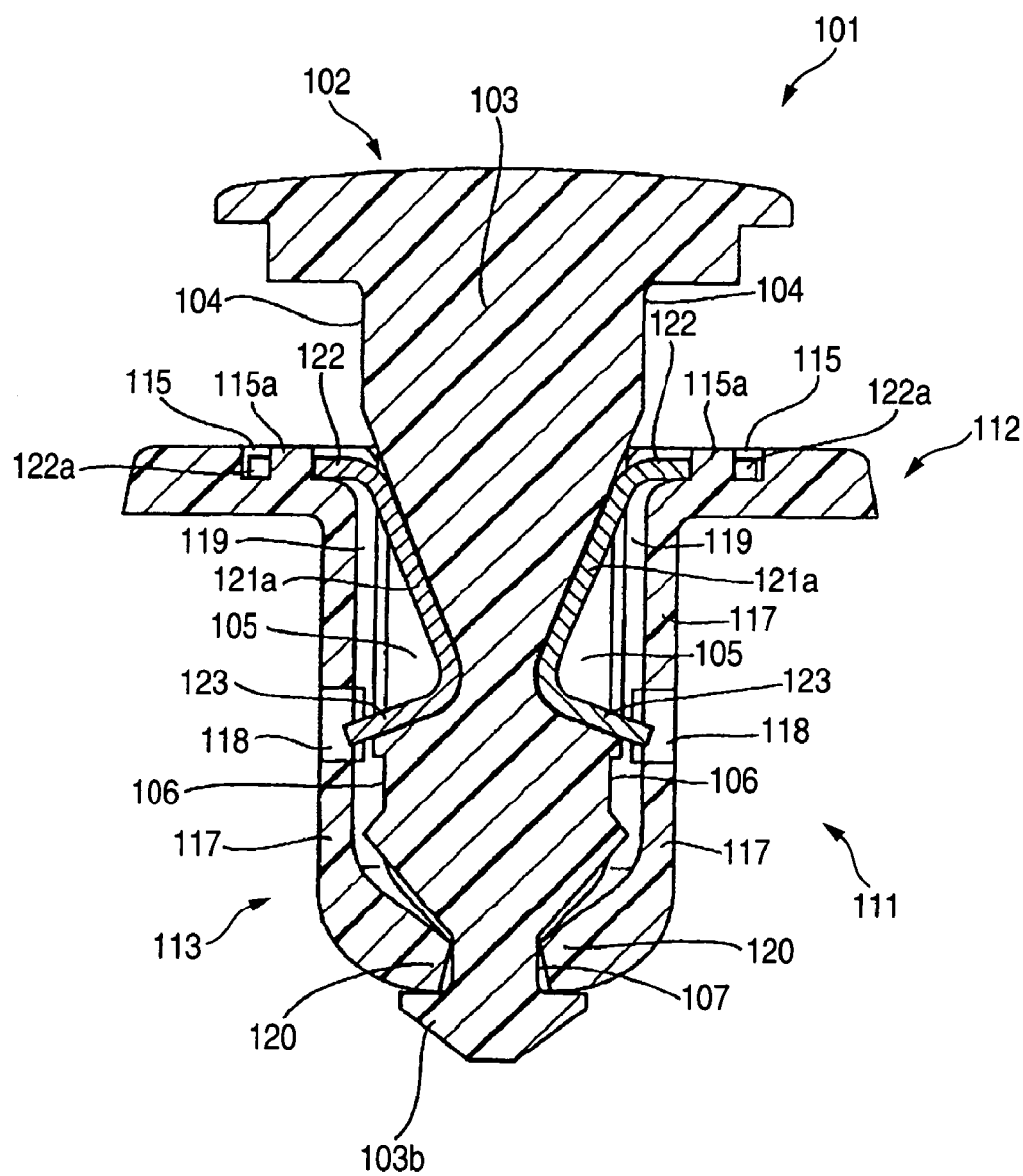
FIG. 16 is a sectional view showing a state of tacking the pin to the grommet.

Hence, next, when the shaft portion 103 of the pin 101 is inserted into the barrel portion 113 of the grommet 111 from a side of a front end portion 103a thereof, as shown by FIG. 16, the front end portion 103a of the pin 101 is projected outward from a front end edge of the barrel portion 113 of the grommet 111 and the pin 101 and the grommet 111 are temporarily tacked. Further, in the tacked state, the outward directed pinching pieces 123 of the respective pinching members 121 are received in the containing chambers 105 of the shaft portion 103 and therefore, the outward pinching pieces 123 are immerged into the barrel portion 113 of the grommet 111 without being projected outward from the opening windows 118 in correspondence therewith. Further, the bulged projections 120 of the respective divided leg pieces 117 of the barrel portion 113 are engaged with the small diameter groove 107 of the shaft portion and therefore, also the respective divided leg pieces are not expanded to open yet.

Figure 17:
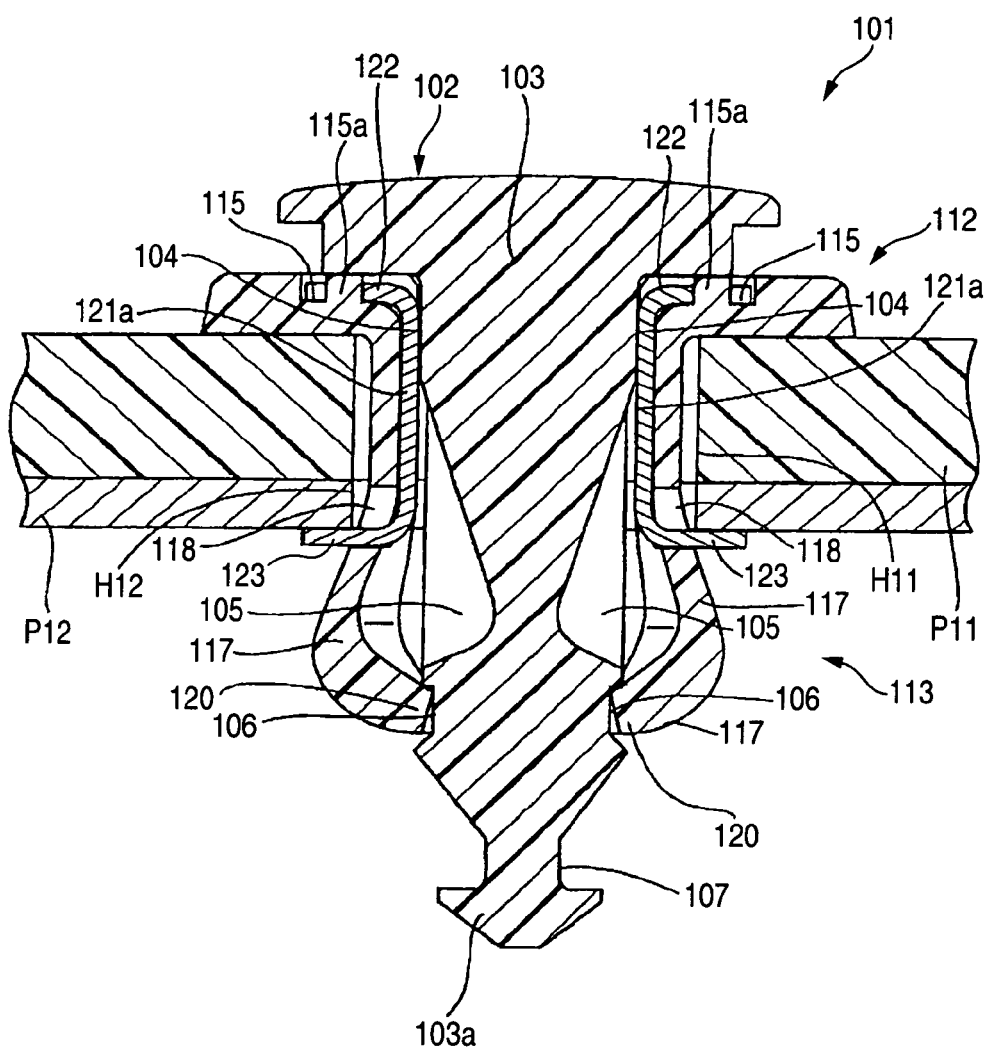
FIG. 17 is a sectional view showing a state of fixing a trim board and a vehicle body panel in an overlapped state by using the fastener according to the third embodiment.

Therefore, after achieving the state of tacking the pin and the grommet 111, the trim board P11 is made to overlap the vehicle body panel P12, the barrel portion 113 of the grommet 111 is inserted into respective attaching holes H11, H12 coinciding with each other, further, when the shaft portion 103 of the pin 101 is pushed into the grommet 111 completely until the head portion 102 of the pin 101 is brought into contact with the flange portion 112 of the grommet 111, at this occasion, sides of the outward directed pinching pieces 123 of the respective pinching members 121 which have been received in the containing chambers 105 of the shaft portion 103 are pressed by the press faces 104 of the shaft portion 103 to be accompanied by elastic bending, the outward directed pinching pieces 123 of the respective pinching members 121 are projected outward from the opening windows 118 formed at the divided leg pieces 117 of the grommet 111 and therefore, thereby, as shown by FIG. 17, the trim board P12 and the vehicle body panel P12 are firmly pinched between the flange portion 112 of the grommet 111 made of the synthetic resin and the outward pinching pieces 123 of the pinching members 121 made of the metal and the two members P11 and P12 are solidly overlapped to fix by a strong pinching force exerted from the synthetic resin and the metal. Therefore, according to the embodiment, reliability of a fixed state is further promoted.

Further, in the fixed state, by pressing the pin 101, as illustrated, at this occasion, the bulged projections 120 of four sheets of the divided leg pieces 117 are engaged with the large diameter groove 106 formed at the shaft portion 103 of the pin 101 to expand to open outward and therefore, also by expanding to open the respective divided leg pieces 117, the trim board P11 and the vehicle body panel P12 can be pinched. Particularly, in this case, on sides at which the pinching members made of the metal are not present, expanding to open the divided leg pieces 117 which are not formed with the opening windows 118 positively relates to the pinching and therefore, a uniform pinching force is exerted over an entire periphery thereof.

Further, by projecting the outward directed pinching pieces 123 of the pinching members 121 from the opening windows 118 of the divided leg pieces 117, lower edges of the opening windows 118 are proximate to be opposed to lower faces of the outward directed pinching pieces 123, in this case, when the divided leg pieces 117 in correspondence therewith are expanded to open outward, the lower edges of the opening windows 118 formed at the divided leg pieces 117 can support the lower faces of the front end portions of the outward directed pinching pieces 123 and therefore, a force of backing the outward directed pinching pieces 123 is effectively exerted and the outward pinching pieces 123 made of the metal are not bent.

Conversely, in the case of releasing the state of fixing the trim board P11 and the vehicle body panel P12 as necessary, when the shaft portion 103 of the pin 101 is pulled up from the barrel portion 113 of the grommet 111 to the above-described tacked state by inserting a front end of a tool (not illustrated) of a minus screwdriver or the like into a space partitioned by the head portion 102 of the pin 101 and the flange portion 112 of the grommet 111, and the sides of the outward directed pinching pieces 123 of the respective pinching members 121 which have been pressed by the press faces 104 formed at the shaft portion 103 of the pin 101 are elastically recovered in directions of eliminating elastic bending and automatically received into the containing chambers 105 of the shaft portion 103 in correspondence therewith and therefore, the front end portions of the outward directed pinching pieces 123 are immerged into the barrel portion 113 of the grommet 111.

Therefore, after achieving such a state, when the shaft portion 103 of the pin 101 is completely drawn out from the barrel portion 113 of the grommet 111 as it is, the shaft portion 103 of the pin 101 can be drawn out from the barrel portion 113 of the grommet 111 by a small force without unnecessarily deforming not only the pin 101 and the grommet 111 but also the pinching members 121 and therefore, the fastener per se can sufficiently be used again.

Embodiment 4

Next, explaining a fastener according to a fourth embodiment, whereas the above-described third embodiment adopts the constitution of automatically receiving the outward directed pinching pieces 123 of the pinching members 121 to the containing chambers 105 formed at the shaft portion 103 of the pin 101 by utilizing elastic bending and elastic recovery of the pinching members 121 made of the metal, the fourth embodiment is constructed by a constitution in which the pinching member 121 is formed by a highly rigid metal plate, and the outward directed support arm 122 of the pinching member 121 is pivotably held at a support portion on a side of the grommet 111.

Figure 18:
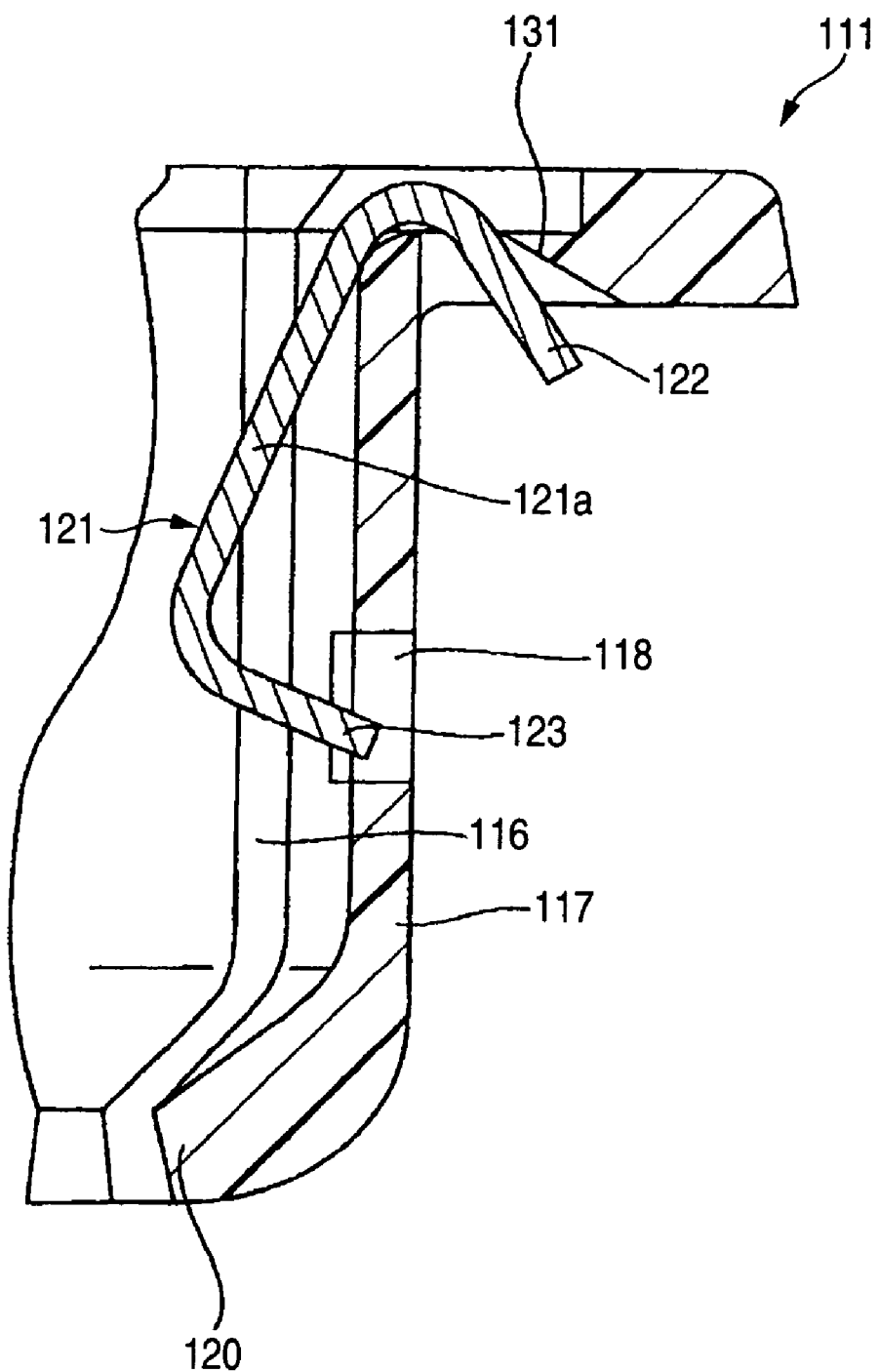
FIG. 18 is a sectional view enlarging an essential portion showing a fastener according to a fourth embodiment of the invention.

Specifically explaining the constitution, as shown by FIG. 18, whereas the outward directed support arm 122 of the pinching member 121 is constituted by a hook shape in a shape of a circular arc, the flange portion 112 of the grommet 111 is formed with a catch hole 131 for catching the outward directed support arm 122 in the hook shape and the outward directed support arm 122 of the pinching member 121 is pivotably held by constituting a fulcrum by a lower face of the hook shape.

Therefore, according to the fourth embodiment, in releasing the state of fixing the trim board P11 and the vehicle body panel P12, when the shaft portion 103 of the pin 101 is pulled up from the barrel portion 113 of the grommet 111 to the tacked state, there is brought about a situation in which the outward directed pinching piece 123 of the pinching member 121 is not automatically received in the containing chamber 105, however, when the shaft portion 103 of the pin 101 is completely drawn out from the barrel portion 113 of the grommet 111, a hindrance is not constituted and therefore, the outward directed pinching piece 123 of the pinching member 121 can easily be pivoted to immerge in an inner direction of the barrel portion 113 and therefore, when the grommet 111 is drawn out from the respective attaching holes of the trim board P11 and the vehicle body panel P12, there is not a concern of unnecessarily deforming the outward directed pinching piece of the pinching member 121. In addition thereto, according to the fourth embodiment, the pinching member 121 per se can be formed by the highly rigid metal plate and therefore, in comparison with the third embodiment, there is achieved an advantage of capable of providing the fastener having a stronger pinching force.

Figure 19A:
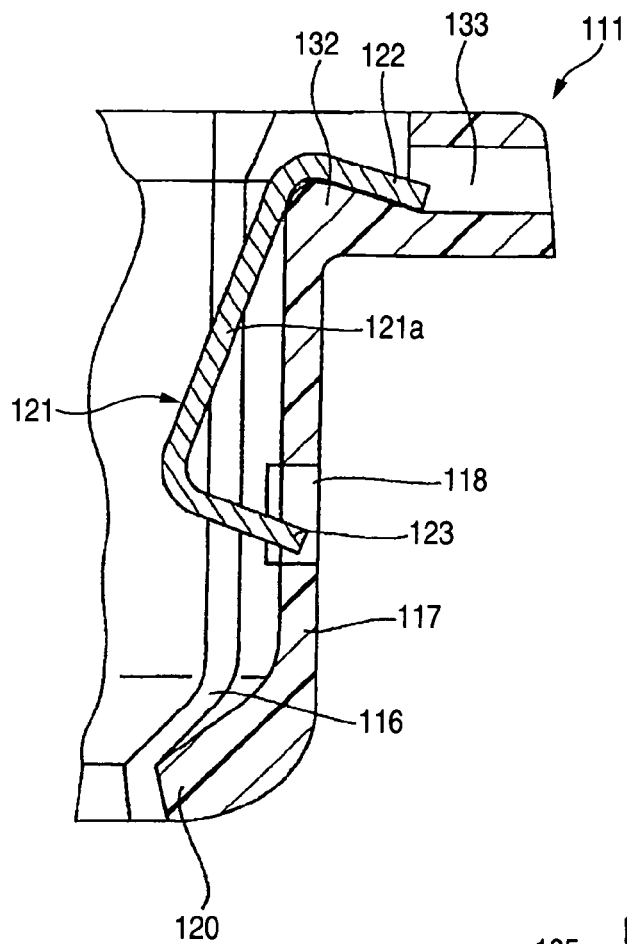
FIG. 19A is a sectional view enlarging an essential portion showing a first modified example of the fourth embodiment.
Figure 19B:
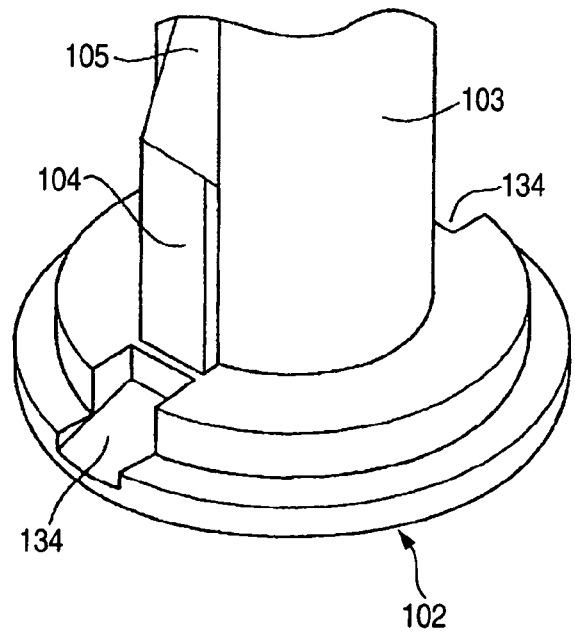
FIG. 19B is a perspective view enlarging an essential portion showing other modified example of the same.

Further, as a modified example of the fourth embodiment, a similar effect can be achieved when whereas the outward directed support arm 122 of the pinching member 121 is constituted by a shape of a flat plate as shown by FIG. 19A, an inclined base 132 for pivotably mounting the outward directed support arm 122 substantially in the shape of the flat plate is formed at the flange portion 112 of the grommet 111, and a space 133 for permitting to pivot the outward directed support arm is partitioned at an upper portion of the inclined base 132, or a space 134 for permitting to pivot the outward directed support arm 122 is conversely partitioned at a lower face of the head portion 102 of the pin 101 as shown by FIG. 19B.

The fastener according to the invention is much preferable particularly when an interior or an exterior part of an automobile or the like is fixed to a predetermined vehicle body panel since an object to be fixed can solidly be fixed by a strong pinching force by positively utilizing a pinching member made of a metal.

What is claimed is:

1. A fastener comprising:
a pin comprising synthetic resin;
a grommet comprising synthetic resin; and
a pinching member comprising metal, wherein:
the pin comprises a head portion and a shaft portion;
the grommet comprises a flange portion and a barrel portion which includes an opening window;

the pinching member comprises an inward directed support arm and an outward directed pinching piece;
the pin includes:
- a support portion for supporting the inward directed support arm of the pinching member slidably in an axial direction with respect to the pin;
- a containing chamber for radially-inwardly accommodating a side of the outward directed pinching piece; and
- a press face for radially-outwardly pressing the outward directed pinching piece to extend into the opening window of the grommet when the shaft portion of the pin is pushed into the barrel portion of the grommet, wherein the support portion is at the shaft portion of the pin and includes an engaging edge for engaging with the inward directed support arm of the pinching member to hang down at a lower end thereof; and wherein the pinching member is contained in the containing chamber formed at the shaft portion of the pin when the pinching member is hanging from the engaging edge by the inward directed support arm.

2. The fastener of claim 1, wherein
the engaging edge comprises an inclined face.

3. A fastener comprising:
a pin comprising synthetic resin;
a grommet comprising synthetic resin; and
a pinching member comprising metal, wherein:
the pin comprises a head portion and a shaft portion;
the grommet comprises a flange portion and a barrel portion which includes an opening window;
the pinching member comprises an inward directed support arm and an outward directed pinching piece;
the pin includes:
- a support portion for supporting the inward directed support arm of the pinching member slidably in an axial direction with respect to the pin;
- a containing chamber for radially-inwardly accommodating a side of the outward directed pinching piece; and
- a press face for radially-outwardly pressing the outward directed pinching piece to extend into the opening window of the grommet when the shaft portion of the pin is pushed into the barrel portion of the grommet, wherein:
the pinching member includes a detachment preventing claw directed outward on a side that is opposed to the inward directed support arm; and
the flange portion of the grommet includes a catch portion for catching the detachment preventing claw.

4. The fastener of claim 3, wherein
an upper face of the catch portion comprises a taper shape.

5. The fastener of claim 3, wherein:
the catch portion comprises:
an upper wall,
an upper face of which comprises a taper shape; and
a lower wall extending in a diameter direction on a lower side of the upper wall, and
the detachment preventing claw of the pinching member may be accommodated by a recess space between the upper wall and the lower wall.

6. The fastener of claim 3, wherein:
the inward directed support arm of the pinching member can be moved radially-inward and radially-outward in the support portion at a lower end region of the support portion;
the detachment preventing claw can pass the catch portion when the inward directed support arm is at a radially-inward position; and
the detachment preventing claw cannot pass the catch portion when the inward directed support arm is at a radially-outward position.

* * * * *